US012772331B2

(12) United States Patent
Zhang et al.

(10) Patent No.: US 12,772,331 B2
(45) Date of Patent: Oct. 20, 2026

(54) COMMUNICATION METHOD AND DEVICE

(71) Applicant: Huawei Technologies Co., Ltd., Shenzhen (CN)

(72) Inventors: Yangyang Zhang, Beijing (CN); Shulan Feng, Beijing (CN); Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 18/438,799

(22) Filed: Feb. 12, 2024

(65) Prior Publication Data

US 2024/0188180 A1 Jun. 6, 2024

Related U.S. Application Data

(63) Continuation of application No. PCT/CN2022/109394, filed on Aug. 1, 2022.

(30) Foreign Application Priority Data

Aug. 13, 2021 (CN) ........................ 202110932814.9

(51) Int. Cl.
*H04W 76/28* (2018.01)
*H04W 52/02* (2009.01)

(52) U.S. Cl.
CPC ....... *H04W 76/28* (2018.02); *H04W 52/0235* (2013.01); *H04W 52/0274* (2013.01)

(58) Field of Classification Search
CPC ......... H04W 52/0216; H04W 52/0229; H04W 52/0235; H04W 52/0274; H04W 76/28; Y02D 30/70
USPC .......................................................... 370/329
See application file for complete search history.

(56) References Cited

U.S. PATENT DOCUMENTS

2011/0128865 A1* 6/2011 Doppler ................ H04W 76/28 370/252
2012/0069782 A1 3/2012 Kuo et al.
2013/0294313 A1* 11/2013 Han .................. H04W 52/0209 370/311
2015/0181526 A1 6/2015 Lee et al.
2016/0021700 A1 1/2016 Oh et al.
(Continued)

FOREIGN PATENT DOCUMENTS

CN 108696922 A 10/2018

OTHER PUBLICATIONS

3rd Generation Partnership Project; Technical Specification Group Radio Access Network; NR; Radio Resource Control (RRC) protocol specification (Release 16), 3GPP TS 38.331 V16.5.0 (Jun. 2021), total 959 pages.
(Continued)

*Primary Examiner* — Robert J Lopata
(74) *Attorney, Agent, or Firm* — Slater Matsil, LLP

(57) ABSTRACT

This application provides a communication method and a device, to reduce power consumption of a terminal. In this application, a network device sends first signaling, where the first signaling indicates a length and/or a start time unit of each DRX cycle in a plurality of DRX cycles, and at least two DRX cycles in the plurality of DRX cycles have different lengths. The network device performs information transmission based on the plurality of determined DRX cycles. Therefore, power consumption of the terminal device can be reduced.

18 Claims, 15 Drawing Sheets

(56) References Cited

U.S. PATENT DOCUMENTS

| | | | | |
|---|---|---|---|---|
| 2017/0064770 | A1* | 3/2017 | Patwardhan | H04W 74/08 |
| 2017/0156176 | A1 | 6/2017 | Bergquist et al. | |
| 2017/0318536 | A1* | 11/2017 | Manepalli | H04W 24/02 |
| 2021/0105856 | A1* | 4/2021 | Rico Alvarino | H04W 4/80 |
| 2021/0298115 | A1* | 9/2021 | Shi | H04W 52/0216 |
| 2022/0007284 | A1* | 1/2022 | Terry | H04W 76/28 |
| 2024/0129072 | A1* | 4/2024 | Hu | H04L 1/1864 |

OTHER PUBLICATIONS

3rd Generation Partnership Project; Technical Specification Group Radio Access Network; NR; Medium Access Control (MAC) protocol specification (Release 16), 3GPP TS 38.321 V16.5.0 (Jun. 2021), total 157 pages.

* cited by examiner

COMMUNICATION METHOD AND DEVICE

CROSS-REFERENCE TO RELATED APPLICATIONS

This application is a continuation of International Application No. PCT/CN2022/109394, filed on Aug. 1, 2022, which claims priority to Chinese Patent Application No. 202110932814.9, filed on Aug. 13, 2021. The disclosures of the aforementioned applications are hereby incorporated by reference in their entireties.

TECHNICAL FIELD

Embodiments of this application relate to the field of communication technologies, and in particular, to a communication method and a device.

BACKGROUND

In a communication process between a terminal device and a network device, a discontinuous reception DRX (discontinuous reception) technology is introduced to save power of the terminal device. A DRX status may be classified into a sleep period and an active period. In the active period, the terminal device enables a transmitter or a receiver to communicate with the network device. In the sleep period, the terminal device disables the transmitter or the receiver to save power.

Because a time at which information is transmitted to the terminal device cannot be determined, there is a problem that the DRX active period does not match the time at which the information is transmitted to the terminal device. Therefore, information transmission can be performed only in a next active period, and a transmission delay is excessively long. In addition, if the time at which the information is transmitted does not match the DRX active period, activation of the transmitter or the receiver by the terminal device is invalid. This causes a waste of energy of the terminal device.

SUMMARY

Embodiments of this application provide a communication method and a related device, to reduce power consumption of a terminal device.

According to a first aspect, this application provides a communication method. The method may be performed by a network device or a chip used in the network device. The following provides descriptions by using an example in which the method is performed by the network device. The network device sends first signaling. The first signaling indicates a length and/or a start time unit of each DRX cycle in a plurality of DRX cycles. In the plurality of DRX cycles, at least two DRX cycles have different lengths. The network device performs information transmission based on the plurality of DRX cycles.

A time difference between a time at which service information is transmitted to a terminal device and a start moment of a DRX cycle active period is referred to as an offset value. In the method of this application, DRX cycles of different lengths are set to limit an upper limit of the offset value. As long as the upper limit of the offset value is not greater than active period duration, it can be ensured that all moments at which the service information is transmitted to the terminal device fall within the active period. Therefore, compared with an existing DRX mechanism, this mechanism reduces a quantity of invalid active periods. A communication delay is reduced, and energy consumption of the terminal device is reduced.

Information transmission may include: The terminal device receives information from the network device by using a receiver; or the terminal device sends information to the network device by using a transmitter. The DRX mechanism is used by the terminal device to control enabling and disabling of the receiver or the transmitter. The receiver and the transmitter are collectively referred to as a transceiver below. Information transmission in a specific direction is described herein, and details are not described below again.

In this application, transmitted information may be service information. In addition to the service information, the transmitted information may alternatively be another type of information, for example, control information, a reference signal, or data information, provided that the transmitted information is information exchanged between the network device and the terminal device. This is not limited herein. The following uses the service information as an example, and no limitation is imposed.

In this application, a start time unit of a DRX cycle indicates a start moment of the DRX cycle, and specifically indicates a time unit at which the DRX cycle starts. A time unit is one or more slots, one or more symbols, or another time unit.

In a possible design, there is a correspondence between the start time unit of each DRX cycle in the plurality of DRX cycles, a start offset startoffset, and a period T.

In this application, the start offset startoffset is a start time unit of a first DRX cycle in the plurality of DRX cycles. In addition, startoffset may alternatively be another value, for example, a start time unit of a first DRX cycle configured by the network device. This is not limited herein.

In this application, the period T is a service period, namely, an arrival period of the service information. In addition, the period T may alternatively represent other content, for example, a feedback period or a period determined by measurement, provided that the period T is related to the service information. This is not limited herein. The period T may be determined through measurement. In addition to measurement, the period T may alternatively be determined by using another method such as feedback. This is not limited herein.

In a possible design, before sending the first signaling, the network device determines start time units of the plurality of DRX cycles based on the start offset startoffset and the period T. The start time units of the plurality of DRX cycles may be indicated to the terminal device based on the first signaling. For example, the start time units of the plurality of DRX cycles may be indicated based on one or more field domains in the first signaling.

In a solution in which the first signaling directly indicates the start time unit of each DRX cycle in this application, the terminal device may directly determine the start time unit of each DRX cycle based on the first signaling, and the start time unit is used as a start moment of the transceiver. This improves processing efficiency of the terminal device, and reduces consumption of resources such as computing power and cache of the terminal device. In addition, when there are few DRX cycle configuration types, the start time unit of each DRX cycle is carried in the first signaling with a small information amount. This can save communication resources.

In a possible design, the first signaling carries the start offset startoffset and the period T, and the start offset startoffset and the period T are used by the terminal device to determine the start time units of the plurality of DRX cycles.

In this application, the first signaling carries the start offset startoffset and the period T, and the network device does not need to determine the start time unit of each DRX cycle based on the start offset startoffset and the period T, thereby saving computing resources of the network device. In addition, when there are many DRX cycle configuration types, the start offset startoffset and the period T are carried in the first signaling with a small information amount. This can save communication resources.

In a possible design, a start time unit of an $n^{th}$ DRX cycle in the plurality of DRX cycles satisfies Formula 1, where fun is a rounding function and n is a positive integer:

$$\text{start time unit of the } n^{th} \text{ DRX cycle} = \text{fun}(T\times(n-1)) + \text{startoffset} \quad \text{(Formula 1)}$$

In this application, the start time unit of the $n^{th}$ DRX cycle is related to the period T, startoffset, and n. Therefore, calculation is simple and convenient, and computing power of the terminal device or the network device can be reduced.

In this application, the rounding function represented by fun may be specifically rounding up. In addition, fun may alternatively represent another rounding function such as rounding down or rounding off. This is not limited herein.

In this application, Formula 1 represents a correspondence between the start time unit of the $n^{th}$ DRX cycle, T, and startoffset, and does not limit a representation form of the correspondence. In other words, in addition to Formula 1, the correspondence may alternatively be represented in another representation manner such as a table. This is not limited herein.

In a possible design, there is a correspondence between the length of each DRX cycle and the period T.

In a possible design, before sending the first signaling, the network device determines lengths of the plurality of DRX cycles based on the period T. The first signaling carries the length of each DRX cycle.

In a solution in which the first signaling directly indicates the length of each DRX cycle in this application, the terminal device may directly determine the length of each DRX cycle based on the first signaling, and determine enabling duration of the transceiver based on the length, thereby improving processing efficiency of the terminal device. This reduces consumption of resources such as computing power and cache of the terminal device. In addition, when there are few DRX cycle configuration types, the first signaling carries the length of each DRX cycle, and an information amount of the first signaling is small, thereby reducing communication resources.

In a possible design, the first signaling carries the period T, and the period T is used by the terminal device to determine the lengths of the plurality of DRX cycles.

In this application, the first signaling carries the period T, and the network device does not need to determine the length of each DRX cycle based on the period T, thereby saving computing resources of the network device. In addition, when there are many DRX cycle configuration types, the period T is carried in the first signaling with the small information amount, so as to save communication resources.

In an implementation, a length of the $n^{th}$ DRX cycle in the plurality of DRX cycles satisfies Formula 2, where fun is a rounding function and n is a positive integer:

$$\text{length of the } n^{th} \text{ DRX cycle} = \text{fun}(T\times n) - \text{fun}(T\times(n-1)) \quad \text{(Formula 2)}$$

In this application, the length of the $n^{th}$ DRX cycle is related to only the period T and n, and no excessive other variables are introduced. Therefore, calculation is simple and convenient, and computing power of the terminal device or the network device can be reduced.

In a possible design, the length of each DRX cycle includes at least a first period length and a length offset corresponding to each DRX cycle. A sum of the first period length and a length offset corresponding to the $n^{th}$ DRX cycle is equal to the length of the $n^{th}$ DRX cycle.

In a possible design, before sending the first signaling, the network device determines the lengths of the plurality of DRX cycles based on the first period length and the length offset corresponding to each DRX cycle. The first signaling carries the length of each DRX cycle.

In a possible design, the first signaling carries the first period length and the length offset corresponding to each DRX cycle, and the first period length and the length offset are used by the terminal device to determine the lengths of the plurality of DRX cycles.

In this application, the first signaling carries the first period length and the length offset, and the network device does not need to determine the length of each DRX cycle based on the first period length and the length offset, thereby saving computing resources of the network device. In addition, first period lengths of the plurality of DRX cycles are the same, and a difference between the lengths of the DRX cycles depends on length offsets corresponding to the DRX cycles. Therefore, the first period length needs to be carried in the first signaling only once or a few times. The first period length occupies a large quantity of bytes, and the length offset occupies a small quantity of bytes. This can reduce a data amount of the first signaling, and save communication resources.

In an implementation, before sending the first signaling, the network device determines a start time unit of an $m^{th}$ DRX cycle in the plurality of DRX cycles based on a first period length value and length offsets corresponding to first (m−1) DRX cycles in the plurality of DRX cycles, where m is an integer greater than 1. The first signaling carries the start time unit of each DRX cycle.

Optionally, the start time unit of the $m^{th}$ DRX cycle, the first period length value, and the length offsets corresponding to the first (m−1) DRX cycles in the plurality of DRX cycles may satisfy a correspondence shown in Formula 3 or Formula 4:

$$\text{start time unit of the } m^{th} \text{ } DRX \text{ cycle} = \sum_{i=1}^{m-1}(\text{length offset}_i + \text{first period length}) \quad \text{(Formula 3)}$$

$$\text{start time unit of the } m^{th} \text{ } DRX \text{ cycle} = \left[\sum_{i=1}^{m-1}(\text{length offset}_i + \text{first period length})\right] + startoffset \quad \text{(Formula 4)}$$

In other words, the start time unit of the $m^{th}$ DRX cycle is equal to a sum of lengths of the first (m−1) DRX cycles, or is equal to a sum of the lengths of the first (m−1) DRX cycles and the start offset startoffset.

It should be noted that, when m is equal to 1, the start time unit of the first DRX cycle is the start offset startoffset.

In a possible design, the first signaling carries the first period length and the length offsets corresponding to the first (m−1) DRX cycles, and the first period length and the length offsets corresponding to the first (m−1) DRX cycles are used by the terminal device to determine a length of the $m^{th}$ DRX cycle. Optionally, the terminal device may determine the length of the $m^{th}$ DRX cycle based on the correspondence reflected in Formula 3 or Formula 4.

In a possible design, a DRX period includes a plurality of DRX cycles, a second period length is a length of the DRX period, and a first offset is used to determine a start time unit of each DRX cycle in the DRX period.

In a possible design, a length of each DRX cycle is determined by at least the second period length and a first offset corresponding to each DRX cycle.

In a possible design, before sending the first signaling, the network device determines the length of each DRX cycle based on the second period length and the first offset corresponding to each DRX cycle. The first signaling carries the length of each DRX cycle.

In a possible design, the first signaling carries the second period length and the first offset corresponding to each DRX cycle, and the second period length and the first offset are used by the terminal device to determine lengths of the plurality of DRX cycles.

In this application, the terminal device may directly determine the start time unit and the length of each DRX cycle based on the second period length and the first offset that are indicated by the first signaling, and does not need to calculate the start time unit and/or the length of each DRX cycle in another manner. This reduces consumption of computing power of the terminal device.

In a possible design, lengths of a plurality of DRX periods are the same, the second period length is a common length of the plurality of DRX periods, and the first offset is a start time unit of each of the plurality of DRX periods.

In a possible design, each DRX period includes one DRX cycle, and a start time unit of each DRX cycle is equal to a start time unit of the corresponding DRX period, that is, a first offset of the corresponding DRX period.

In a possible design, the first offset may be determined based on an interval between the start time unit of each DRX period and a start time unit of a first DRX period in the plurality of DRX periods. In addition, the first offset may alternatively be another value, for example, a start time unit of a DRX cycle configured by the network device. This is not limited herein.

In a possible design, the network device sends second signaling. The second signaling indicates to update the start time unit and/or the length of each DRX cycle in the plurality of DRX cycles.

In this embodiment of this application, the network device updates the DRX cycle based on the second signaling, so that an updated DRX cycle has a smaller offset value than the DRX cycle before the update. Therefore, a communication delay and a packet loss rate are reduced, and power consumption of the terminal device is reduced.

In a possible design, a length of the updated DRX cycle is the same as a length of the corresponding DRX cycle before the update. The second signaling indicates the length of the updated DRX cycle.

In this application, a problem that the DRX cycle does not match the service information because an arrival time of the service information is earlier or later than an expected time can be resolved by updating the length of the DRX cycle without changing the length of the DRX cycle. The second signaling does not need to carry the length of the DRX cycle, and an information amount is small, thereby saving communication resources.

In a possible design, a start time unit and a length of an updated DRX cycle are different from a start time unit and a length of a corresponding DRX cycle before the update.

In this application, the start time unit of the DRX cycle is updated, so that the start time unit of the DRX cycle better matches the arrival time of the service information. The length of the DRX cycle is updated, so that the length of the DRX cycle better matches a period of the service information.

In a possible design, before sending the second signaling, the network device receives third signaling, and determines the second signaling based on the third signaling. The third signaling includes at least one of the following: a DRX cycle offset expected by the terminal device, a DRX cycle length expected by the terminal device, activation onduration duration expected by the terminal device, or inactive inactivity duration expected by the terminal device.

In this application, the terminal device can learn of the arrival time of the service information in a more timely and accurate manner. Therefore, the DRX cycle (second signaling) is configured based on DRX cycle configuration (third signaling) expected by the terminal device. The configured DRX cycle (second signaling) can better match the arrival time of the service information, thereby reducing a communication delay and a packet loss rate, and reducing power consumption of the terminal device.

Optionally, in this application, even if the network device receives the third signaling, the network device may not determine the second signaling based on the third signaling, but determine, based on other information, the updated DRX cycle indicated by the second signaling. For example, the updated DRX cycle indicated by the second signaling is determined based on a current network status, a time at which the service information is transmitted to the network device, and the like. This is not limited herein.

In a possible design, the first signaling carries content that is used by the terminal device to determine the start time unit and/or the length of the DRX cycle, such as startoffset and T. After sending the first signaling, the network device receives fourth signaling. The fourth signaling indicates the length and/or the start time unit of each DRX cycle. The network device performs information transmission based on a plurality of DRX cycles indicated by the fourth signaling.

In this application, the terminal device determines the start time unit and/or the length of the DRX cycle based on the content carried in the first signaling, and the network device aligns the start time unit and/or the length of the DRX cycle with the terminal device based on the fourth signaling, to perform communication. The network device does not need to determine the start time unit and/or the length of the DRX cycle by itself. This saves computing resources of the network device.

In a possible design, the first signaling to the fourth signaling are collectively referred to as signaling, and the signaling may be control information or higher layer signaling. For example, the control information may be downlink control information (dDCI) or uplink control information (UCI). For example, the higher layer signaling may be radio resource control (RRC) signaling or media access control control element (MAC CE) signaling. Different types of signaling may be the same or different. For example, the signaling may be the DCI, the UC, the RRC signaling, or the MAC CE signaling.

In a possible design, at least one of configurations related to the DRX cycle, for example, the start time units/lengths of the plurality of DRX cycles, the start time unit of the $n^{th}$ DRX cycle, and the period T, is based on a same time unit. The time unit may be at least one of a millisecond, a second, a subframe, a slot, a mini-slot, and a symbol. The mini-slot includes a plurality of symbols.

In this application, at least one of the plurality of configurations of the DRX cycle is based on the same time unit, so that no unit conversion needs to be performed in a determining process or a use process of configurations that have a correspondence. In this way, consumption of resources such as computing power and cache of the network device and/or the terminal device caused by unit conversion is reduced.

In this application, the DRX cycle is configured in a time unit different from the period T, so that a granularity of a difference between the length of the DRX cycle and duration of a service information period can be reduced. This reduces an offset value, reduces a communication delay and a packet loss rate, and reduces power consumption of the terminal device. For example, for service information with a period of 16.67 ms, if a length unit of the DRX cycle is ms, when the length of the DRX cycle is configured to be 17 ms, there is an offset value of 0.33 ms between the length of the DRX cycle and the service information period. If the length unit of the DRX cycle is symbol, when a subcarrier spacing is 15 kHz, the length of the DRX cycle is configured as 16×14+9=233 symbols. When the length of the DRX cycle is 16.64 ms, there is an offset value of 0.03 ms between the length of the DRX cycle and an XR service period 16.67 ms, and the offset value is less than the offset value in the same time unit.

According to a second aspect, an embodiment of this application provides a communication method. The method may be performed by a terminal device or a chip used in the terminal device. The following provides descriptions by using an example in which the method is performed by the terminal device. The terminal device receives first signaling. The first signaling indicates a length and/or a start time unit of each DRX cycle in a plurality of DRX cycles, and at least two DRX cycles in the plurality of DRX cycles have different lengths. The terminal device performs information transmission based on the plurality of DRX cycles.

For beneficial effect of the second aspect of embodiments of this application, refer to the first aspect. Details are not described herein again.

In a possible design, there is a correspondence between the start time unit of each DRX cycle, a start offset startoffset, and a period T.

In a possible design, the first signaling carries the start time unit of each DRX cycle.

In a possible design, the first signaling carries the start offset startoffset and the period T, and the terminal device determines the start time unit of each DRX cycle based on the start offset startoffset and the period T.

In a possible design, a start time unit of an $n^{th}$ DRX cycle in the plurality of DRX cycles satisfies Formula 1, where fun is a rounding function and n is a positive integer:

$$\text{start time unit of the } n^{th} \text{ DRX cycle} = \text{fun}(T \times (n-1)) + \text{startoffset} \qquad \text{(Formula 1)}$$

In a possible design, there is a correspondence between the length of each DRX cycle and the period T.

In a possible design, the first signaling carries the length of each DRX cycle.

In a possible design, the first signaling carries the period T, and the terminal device determines the length of each DRX cycle based on the period T.

In a possible design, a length of the $n^{th}$ DRX cycle in the plurality of DRX cycles satisfies Formula 2, where fun is a rounding function and n is a positive integer:

$$\text{length of the } n^{th} \text{ DRX cycle} = \text{fun}(T \times n) - \text{fun}(T \times (n-1)) \qquad \text{(Formula 2)}$$

In a possible design, the length of each DRX cycle includes at least a first period length and a length offset corresponding to each DRX cycle.

In a possible design, the first signaling carries the first period length and the length offset corresponding to each DRX cycle, and the terminal device determines the length of each DRX cycle based on the first period length and the length offset corresponding to each DRX cycle.

In a possible design, a start time unit of an $m^{th}$ DRX cycle in the plurality of DRX cycles is determined based on at least a first period length value and length offsets corresponding to first (m−1) DRX cycles in the plurality of DRX cycles, where m is an integer greater than 1.

In a possible design, a DRX period includes a plurality of DRX cycles, a second period length is a length of the DRX period, and a first offset is used to determine a start time unit of each DRX cycle in the DRX period.

In a possible design, a length of each DRX cycle is determined by at least the second period length and a first offset corresponding to each DRX cycle.

In a possible design, the first signaling carries the second period length and the first offset corresponding to each DRX cycle, and the terminal device determines lengths of the plurality of DRX cycles based on the second period length and the first offset.

In a possible design, lengths of a plurality of DRX periods are the same, the second period length is a common length of the plurality of DRX periods, and the first offset is a start time unit of a DRX cycle in the plurality of DRX periods.

In a possible design, each DRX period includes one DRX cycle, and a start time unit of each DRX cycle is equal to a start time unit of a corresponding DRX period, to be specific, a start time unit of an $n^{th}$ DRX cycle is equal to a start time unit of an $n^{th}$ DRX period. A length of the $n^{th}$ DRX cycle is an interval between an $(n+1)^{th}$ DRX period and the start time unit of the $n^{th}$ DRX period.

In a possible design, the first offset may be determined based on an interval between a start time unit of each DRX period and a start time unit of a first DRX period in the plurality of DRX periods. In addition, the first offset may alternatively be another value, for example, a start time unit of a DRX cycle configured by the network device. This is not limited herein.

In a possible design, the terminal device receives second signaling. The second signaling indicates to update the start time unit and/or the length of each DRX cycle in the plurality of DRX cycles.

In a possible design, a length of the updated DRX cycle is the same as a length of the corresponding DRX cycle before the update. The second signaling indicates the length of the updated DRX cycle.

In a possible design, a start time unit and the length of the updated DRX cycle are different from a start time unit and a length of a corresponding DRX cycle before the update.

In a possible design, before receiving the second signaling, the terminal device sends third signaling. The third signaling includes at least one of the following: a DRX cycle offset expected by the terminal device, a DRX cycle length expected by the terminal device, activation onduration duration expected by the terminal device, or inactive inactivity duration expected by the terminal device.

In a possible design, the terminal device determines the start time unit and/or the length of the DRX cycle based on content of the first signaling. The terminal device sends fourth signaling. The fourth signaling indicates the start time unit and/or length of each determined DRX cycle. The terminal device performs information transmission based on the plurality of determined DRX cycles.

In a possible design, the first signaling to the fourth signaling are collectively referred to as signaling, and the signaling may be control information or higher layer signaling. Different types of signaling may be the same or different.

In a possible design, at least one of configurations related to the DRX cycle is based on a same time unit. The time unit may be at least one of a millisecond, a second, a subframe, a slot, a mini-slot, and a symbol. The mini-slot includes a plurality of symbols.

According to a third aspect, an embodiment of this application provides a communication apparatus. For beneficial effect, refer to the descriptions of the first aspect. Details are not described herein again. The communication apparatus has a function of implementing the behavior in the method example in the first aspect. The function may be implemented by hardware, or may be implemented by hardware executing corresponding software. The hardware or the software includes one or more modules corresponding to the foregoing function. In a possible design, the communication apparatus includes: a transceiver module, configured to send first signaling, where the first signaling indicates a length and/or a start time unit of each DRX cycle in a plurality of DRX cycles, and at least two DRX cycles in the plurality of DRX cycles have different lengths; and a processing module, further configured to perform information transmission based on the plurality of DRX cycles. These modules may perform corresponding functions in the method example in the first aspect. For details, refer to the detailed descriptions in the method example. Details are not described herein again.

According to a fourth aspect, an embodiment of this application provides a communication apparatus. For beneficial effect, refer to the descriptions of the second aspect. Details are not described herein again. The communication apparatus has a function of implementing the behavior in the method example in the second aspect. The function may be implemented by hardware, or may be implemented by hardware executing corresponding software. The hardware or the software includes one or more modules corresponding to the foregoing function. In a possible design, the communication apparatus includes: a transceiver module, configured to receive first signaling, where the first signaling indicates a length and/or a start time unit of each DRX cycle in a plurality of DRX cycles, and at least two DRX cycles in the plurality of DRX cycles have different lengths; and a processing module, further configured to perform information transmission based on the plurality of DRX cycles. These modules may perform corresponding functions in the method example in the first aspect. For details, refer to the detailed descriptions in the method example. Details are not described herein again. These modules may perform corresponding functions in the method example in the second aspect. For details, refer to the detailed descriptions in the method example. Details are not described herein again.

According to a fifth aspect, a communication apparatus is provided. The communication apparatus may be the terminal device in the foregoing method embodiments or a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the terminal device in the foregoing method embodiments.

According to a sixth aspect, a communication apparatus is provided. The communication apparatus may be the network device in the foregoing method embodiments or a chip disposed in the network device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the network device in the foregoing method embodiments.

According to a seventh aspect, a computer program product is provided. The computer program product includes computer program code. When the computer program code is run, the method performed by the terminal device in the foregoing aspects is performed.

According to an eighth aspect, a computer program product is provided. The computer program product includes computer program code. When the computer program code is run, the method performed by the network device in the foregoing aspects is performed.

According to a ninth aspect, this application provides a chip system. The chip system includes a processor, configured to implement functions of the terminal device in the methods in the foregoing aspects. In a possible design, the chip system further includes a memory, configured to store program instructions and/or data. The chip system may include a chip, or may include a chip and another discrete component.

According to a tenth aspect, this application provides a chip system. The chip system includes a processor, configured to implement functions of the network device in the methods in the foregoing aspects. In a possible design, the chip system further includes a memory, configured to store program instructions and/or data. The chip system may include a chip, or may include a chip and another discrete component.

According to an eleventh aspect, this application provides a computer-readable storage medium. The computer-readable storage medium stores a computer program. When the computer program is run, the method performed by the terminal device in the foregoing aspects is implemented.

According to a twelfth aspect, this application provides a computer-readable storage medium. The computer-readable storage medium stores a computer program. When the computer program is run, the method performed by the network device in the foregoing aspects is implemented.

DETAILED DESCRIPTION OF ILLUSTRATIVE EMBODIMENTS

Figure 1:
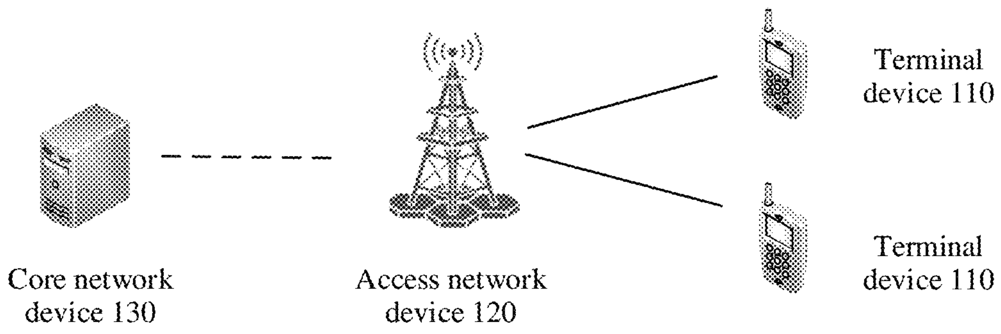
FIG. 1 is a schematic diagram of an application scenario of a communication method according to an embodiment of this application.

FIG. 1 is a schematic diagram of a possible network architecture to which an embodiment of this application is applicable. The network architecture includes terminal devices 110 and an access network device 120. The terminal device 110 and the access network device 120 may communicate with each other through a Uu air interface. The Uu air interface may be understood as a universal interface between a terminal device and a network device (universal UE to network interface). Transmission through the Uu air interface includes uplink transmission and downlink transmission.

The network architecture shown in FIG. 1 may further include a core network device 130. The terminal devices 110 may be connected to the access network device 120 in a wireless manner, and the access network device 120 may be connected to the core network device 130 in a wired or wireless manner. The core network device 130 and the access network device 120 may be different independent physical devices, or the core network device 130 and the access network device 120 may be a same physical device, and all/some logical functions of the core network device 130 and the access network device 120 are integrated in the physical device.

It should be noted that, in the network architecture shown in FIG. 1, the terminal devices 110 may be at fixed locations, or may be movable. This is not limited. The network architecture shown in FIG. 1 may further include other network devices, such as a wireless relay device and a wireless backhaul device. This is not limited. In the architecture shown in FIG. 1, quantities of terminal devices, access network devices, and core network devices are not limited.

Technical solutions in embodiments of this application may be applied to various communication systems, such as a long term evolution (LTE) system, a 5th generation (5G) mobile communication system, and a future mobile communication system.

1. Interpretation of Nouns or Terms Appearing in this Application

The following explains and describes some nouns or terms used in this application, and the nouns or terms are also used as a part of the present invention.

1. Terminal Device

The terminal device may be briefly referred to as a terminal, or referred to as user equipment (UE), which is a device having a wireless transceiver function. The terminal device may be deployed on land, and includes an indoor or outdoor device, a handheld device, or a vehicle-mounted device, may be deployed on water (for example, on a ship), or may be deployed in air (for example, on aircraft, an uncrewed aerial vehicle, a balloon, or a satellite). The terminal device may be a mobile phone, a tablet computer, a computer having a wireless transceiver function, a virtual reality terminal device, an augmented reality terminal device, a wireless terminal device in industrial control, a wireless terminal device in self driving, a wireless terminal device in remote medicine, a wireless terminal device in a smart grid, a wireless terminal device in transportation safety, a wireless terminal device in a smart city, or a wireless terminal device in a smart home. The terminal device may be fixed or mobile. This is not limited in embodiments of this application.

In embodiments of this application, an apparatus configured to implement a function of the terminal may be a terminal device, or may be an apparatus, for example, a chip system, that can support the terminal device in implementing the function. The apparatus may be installed in the terminal device. In this embodiment of this application, the chip system may include a chip, or may include a chip and another discrete component. The technical solutions provided in embodiments of this application are described by using an example in which the apparatus configured to implement the function of the terminal device is the terminal device.

2. Network Device

The network device may be an access network device. The access network device may also be referred to as a radio access network (RAN) device, and is a device that provides a wireless communication function for a terminal device. The access network device includes, for example, but is not limited to, a next generation NodeB (gNB), an evolved NodeB (eNB), a baseband unit (BBU), a transmitting and receiving point (TRP), a transmitting point (TP) in 5G, a base station in a future mobile communication system, or an access point in a Wi-Fi system. Alternatively, the access network device may be a radio controller, a central unit (CU), and/or a distributed unit (DU) in a cloud radio access network (CRAN) scenario, or the network device may be a relay station, a vehicle-mounted device, a network device in a future evolved PLMN network, or the like.

The terminal device may communicate with a plurality of access network devices by using different technologies. For example, the terminal device may communicate with an access network device supporting long term evolution (LTE), may communicate with an access network device supporting 5G, or may communicate with both an access network device supporting LTE and an access network device supporting 5G. This is not limited in embodiments of this application.

In embodiments of this application, an apparatus configured to implement functions of the network device may be a network device, or may be an apparatus, for example, a chip system, that can support the network device in implementing the functions. The apparatus may be installed in the network device. In technical solutions provided in embodiments of this application, the technical solutions provided in embodiments of this application are described by using an example in which the apparatus configured to implement the functions of the network device is the network device.

3. Extended Reality (XR) Service

In recent years, mobile services are booming, and extended reality XR services such as a virtual reality (VR) service, an augmented reality (AR) service, and a mixed reality (MR) service gradually become mature.

XR refers to all real and virtual combined environments and related human-machine interaction generated by computer technologies and wearable devices. Compared with conventional services such as voice services, web browsing services, and games, the XR service has characteristics such as large data packets, a short transmission delay, and periodic transmission.

For ease of description, the following describes the XR service based on information, where the XR service includes a VR service, an AR service, or an MR service.

The XR service has the following features:

(1) Information has a specific periodicity, and a period is a reciprocal of a frame rate, where the frame rate is a frame per second (fps). For example, a frame rate of the information may be 30 fps, 60 fps, 90 fps, or 120 fps, and a corresponding period may be 33.33 ms, 16.67 ms, 11.11 ms, or 8.33 ms.

(2) An information packet is large. When an AR/VR video stream is 60 fps, a bit rate is 30 Mbps or 45 Mbps. When a cloud game is at 60 fps, a bit rate is 8 Mbps, 30 Mbps or 45 Mbps.

(3) There is a jitter in an arrival time of the information packet. For example, a time period of the jitter may be [−4, 4] ms.

(4) The information requires an extremely low transmission delay, and the transmission delay in the network is required to be as low as 5 ms, 10 ms, or 15 ms.

Figure 2A:
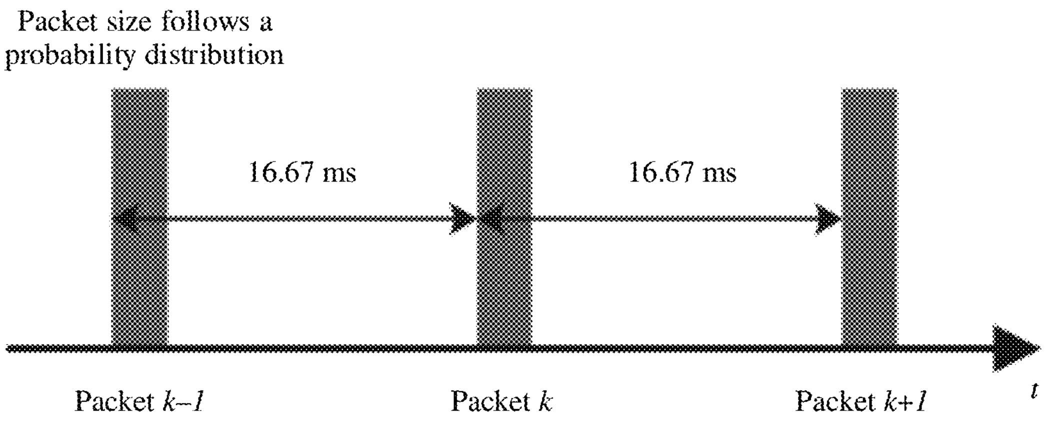
FIG. 2*a* is a schematic diagram of arrival of service information.

It can be learned from the foregoing description that the period of the information may be 33.33 ms, 16.67 ms, 11.11 ms, or 8.33 ms. FIG. 2*a* uses an information frame rate of 60 and a period of 16.67 ms as an example for description.

4. Discontinuous Reception (DRX) Mechanism

To implement communication with the network device, the terminal device needs to enable a transceiver to implement information transmission between the terminal device and the network device. Invalid enabling of the transceiver consumes power of the terminal device. Therefore, a DRX mechanism is introduced to control enabling and disabling of the transceiver of the terminal device by configuring an active period, thereby reducing energy consumption of the terminal device. The transceiver includes a receiver and/or a transmitter.

Figure 2B:
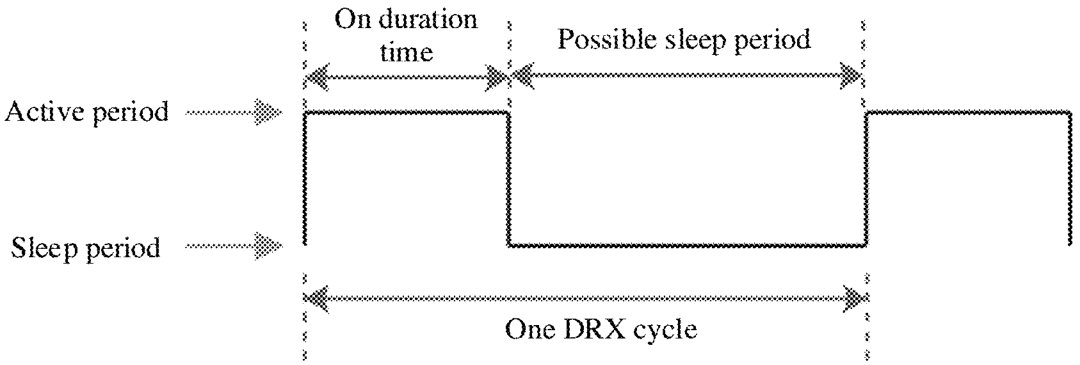
FIG. 2*b* is a schematic diagram of a DRX mechanism.

As shown in FIG. 2*b*, in a DRX working mode, the terminal device needs to periodically enable the transceiver, and a time period in which the transceiver is enabled is referred to as an on duration time. A DRX period can be divided into an active period and a sleep period.

A time period in which the terminal device enables the transceiver is referred to as the DRX active period. In the sleep period, the transceiver of the terminal device is in a disabled state, and cannot communicate with the network device.

As long as the active period matches a time at which the information is transmitted to the terminal device, it can be ensured that the transceiver of the terminal device is in an enabled state when the information is transmitted to the terminal device, to implement information transmission between the terminal device and the network device.

As shown in FIG. 2*a*, an XR video frame with a frame rate of 60 fps is used as service information for description. The service information is periodically sent, and the frame rate is 60 fps. Therefore, a corresponding period is 1/60 s=16.67 ms. Therefore, every 16.67 ms, one XR video frame arrives.

In this embodiment of this application, arrival of the service information has two meanings. In a downlink direction, arrival refers to arrival of the service information at the network device. In an uplink direction, arrival refers to arrival of the service information at the terminal device.

Figure 3:
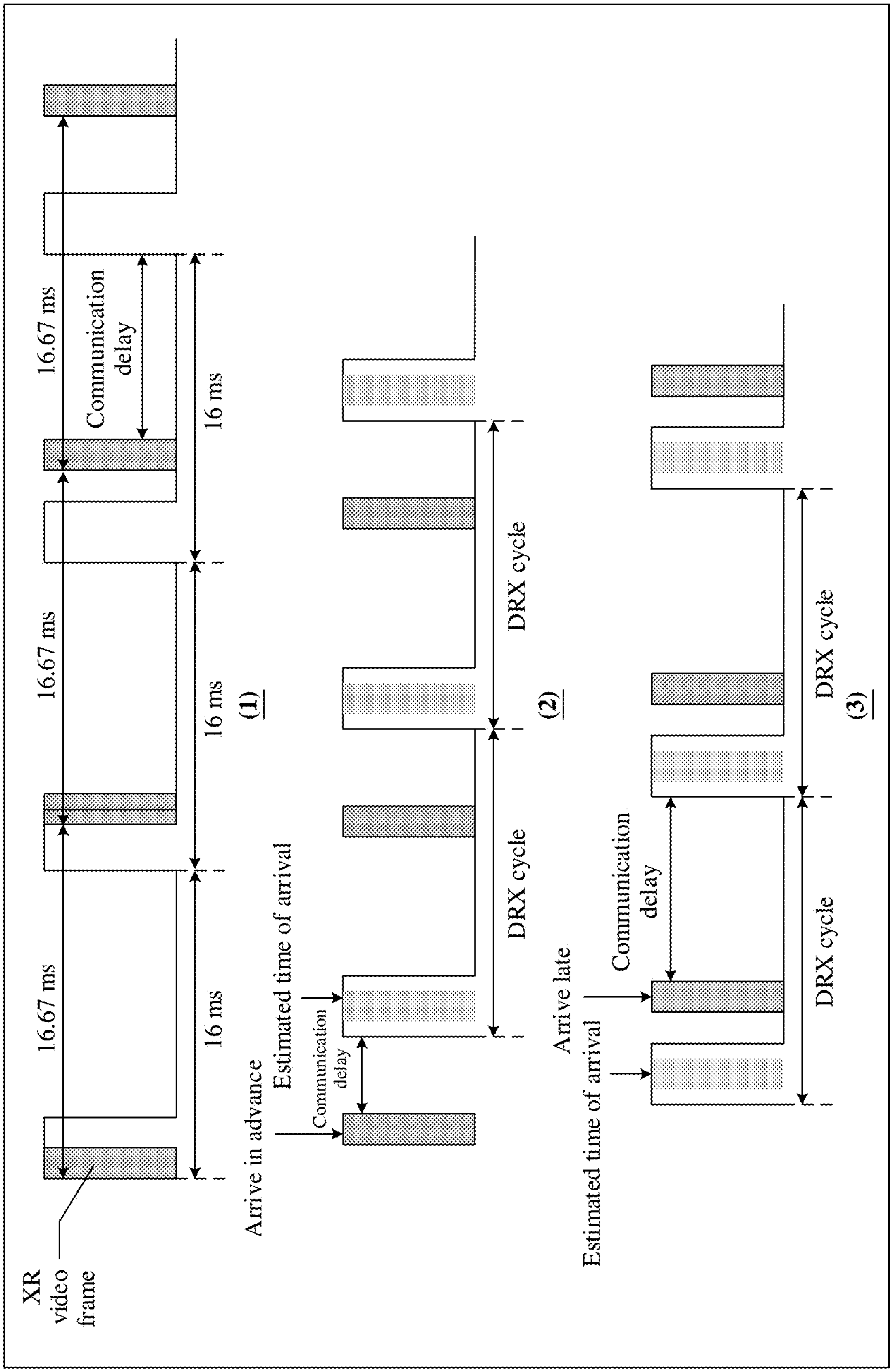
FIG. 3 is a schematic diagram of a defect of a DRX mechanism.

When a DRX cycle cannot completely match the service information, the terminal device is in the sleep period when the service information is transmitted to the terminal device, and the service information is stored in a buffer for transmission in a next active period. As a result, a communication delay is long. If the buffer is full, the service information overflows, resulting in a high packet loss rate. If no service information is transmitted to the terminal device in the active period, enabling of the transceiver in the active period is invalid activation. This causes energy consumption of the terminal device. As shown in FIG. 3, if a length or a start time unit of a DRX cycle does not match a period or an arrival time of the service information, the DRX cycle does not match the service information.

To resolve the foregoing defect, an embodiment of this application provides a communication method. The DRX cycle is adjusted, so that the DRX cycle matches the service information, in other words, a time at which the service information is actually transmitted to the terminal device falls within an active period of the DRX cycle. Therefore, a communication delay and a packet loss rate are reduced, and power consumption of the terminal device is reduced. The following describes the communication method provided in this embodiment of this application.

To resolve the foregoing defect, an embodiment of this application provides a communication method. DRX cycles of different lengths are determined, so that a plurality of DRX cycles match a period of service information.

Figure 4:
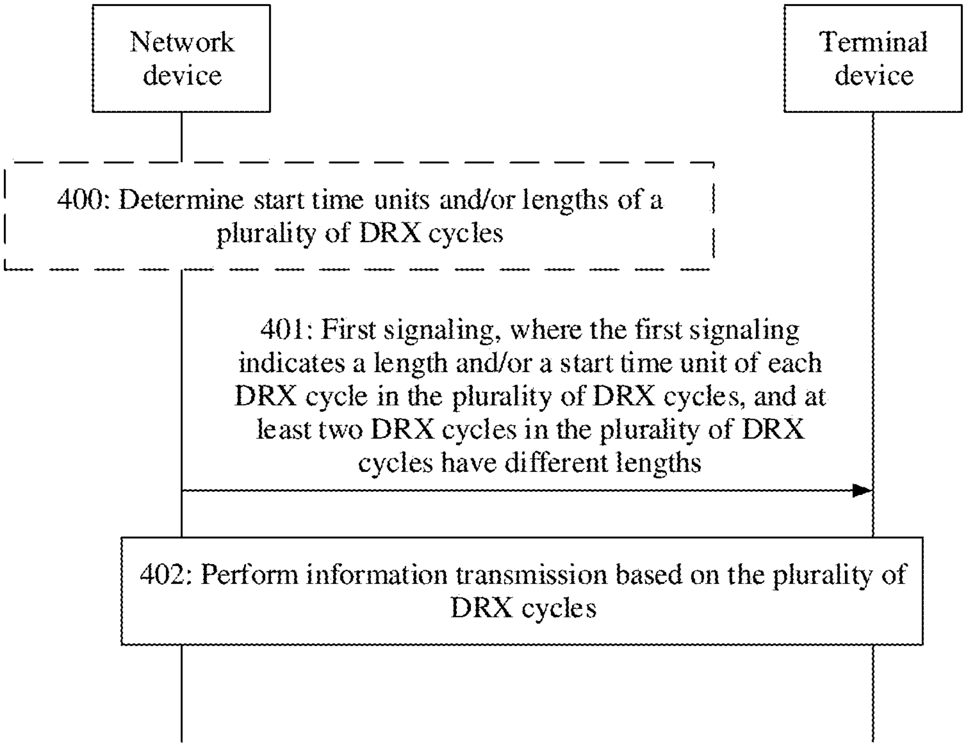
FIG. 4 is a flowchart of a communication method according to an embodiment of this application.

As shown in FIG. 4, an embodiment of this application provides a schematic flowchart of a communication method. The method may be performed by a terminal device and a network device, or may be performed by a chip in the terminal device and a chip in the network device. The network device in FIG. 4 may be the access network device 120 in FIG. 1, and the terminal device may be the terminal device 110 in FIG. 1. The method shown in FIG. 4 may include the following operations.

401: The network device sends first signaling, where the first signaling indicates a length and/or a start time unit of each DRX cycle in a plurality of DRX cycles, and at least two DRX cycles in the plurality of DRX cycles have different lengths. Correspondingly, the terminal device receives the first signaling.

An example in which a frame rate of an XR video frame is 60 fps in FIG. 3 is further described, and a period T is 1000/60 ms=16.67 ms. In this case, a problem that the length of the DRX cycle does not match the period of the service information may occur. To resolve this problem, a determining method shown in (2) in FIG. 5*a* may be used, to be specific, a plurality of DRX cycles that match the period T are determined. A length of a first DRX cycle is 16 ms, a length of a second DRX cycle is 17 ms, and a length of a third DRX cycle is 17 ms. Lengths of subsequent DRX cycles are arranged according to a rule of {16 ms, 17 ms, 17 ms}.

In this application, a time difference between a time at which the service information is transmitted to the terminal device and a start moment of an active period of a DRX cycle is referred to as an offset value. In (2) in FIG. 5*a*, a sum (16 ms+17 ms+17 ms=50 ms) of lengths of first three DRX cycles is equal to three times of the period T (1000/60 msx3=50 ms), that is, 50 ms. Therefore, 50 ms is a cycle. The first three DRX cycles whose total lengths are 50 ms are used as an example for description. An offset value of the first DRX cycle is 0 ms, an offset value of the second DRX cycle is 16.67 ms-16 ms=0.67 ms, and an offset value of the third DRX cycle is (16.67×2) ms−(16+17) ms=0.34 ms. The DRX cycles are arranged according to the rule of {16 ms, 17 ms, 17 ms}. Therefore, offset values of the plurality of DRX cycles are in a cycle of {0 ms, 1.67 ms, 0.34 ms}, and an upper limit of the offset values is 1.67 ms.

Figure 5A:
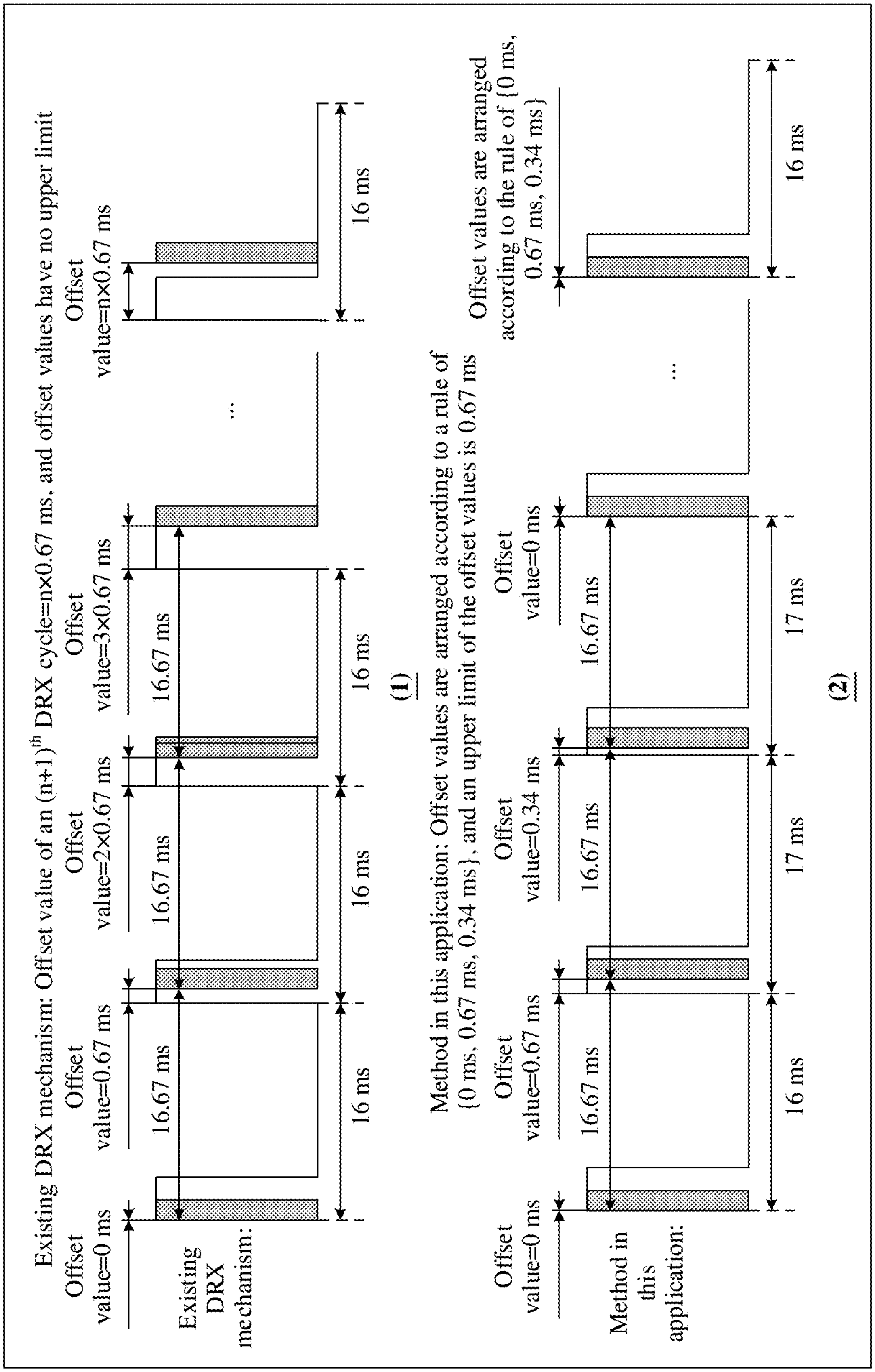
FIG. 5*a* is a schematic diagram of a communication method according to an embodiment of this application.

In an existing DRX mechanism shown in (1) in FIG. 5*a*, an upper limit of offset values cannot be controlled. There is always a DRX cycle whose offset value is greater than an active period, and no service information is transmitted to the terminal device in a corresponding active period, and these active periods are referred to as invalid active periods. The invalid active periods cause a waste of energy consumption of the terminal device. In the method of this application, DRX cycles of different lengths are set to limit the upper limit of the offset value. As long as the upper limit of the offset value is not greater than active period duration, it can be ensured that all moments at which the service information is transmitted to the terminal device fall within the active period. Therefore, compared with the existing DRX mechanism, this mechanism reduces a quantity of invalid active periods. A communication delay is reduced, and energy consumption of the terminal device is reduced.

It should be noted that the rule of {16 ms, 17 ms, 17 ms} shown in FIG. 5*a* is merely an example of a DRX cycle for service information whose period T is 16.67 ms. For service information whose period T is 16.67 ms, the plurality of DRX cycles determined by using the communication method provided in this embodiment of this application may alternatively have another rule, for example, {17 ms, 16 ms, 17 ms}, {17 ms, 17 ms, 16 ms}, or the like. This is not limited herein provided that all moments at which the service information is transmitted to the terminal device fall within the active period of the DRX cycle (the upper limit of the offset value is less than the active period duration).

It should be noted that the offset value is equal to duration in which the service information is not transferred to the terminal device in the active period, and enabling of a transceiver in the terminal device in the duration is invalid activation. Therefore, a smaller offset value indicates shorter invalid activation duration, and power consumption of the terminal can be reduced.

It should be noted that the offset value may alternatively be a negative number, to be specific, a moment at which the service information is transmitted to the terminal device is before an active period start moment of a corresponding DRX cycle. In this case, an absolute value of the offset value is equal to duration in which the service information waits for arrival of the active period in a buffer of the terminal device, that is, an information transmission delay. Therefore, when the offset value is a negative number, a smaller absolute value of the offset value indicates a shorter information transmission delay.

The network device sends the first signaling. Correspondingly, the terminal device receives the first signaling. The start time unit and/or the length of each DRX cycle in the plurality of DRX cycles are/is indicated by the first signaling.

402: The network device and the terminal device perform information transmission based on the plurality of DRX cycles.

If the network device sends the first signaling, the network device may perform information transmission based on the plurality of DRX cycles. Correspondingly, the terminal device receives the first signaling, and the terminal device may determine configurations of the plurality of DRX cycles, so as to perform information transmission based on the plurality of DRX cycles.

It should be noted that in this embodiment of this application, only an XR video frame is used as an example to describe service information whose period is not an integer multiple of ms. In addition to the XR video frame, the service information may be other information, for example, cloud gaming (CG), audio information, image information, text information, and the like. This is not limited herein.

It should be noted that ms is not a unique time unit of the period. In addition to ms, the period may also correspond to another time unit, for example, a second, a subframe, a slot, a mini-slot, or a symbol. This is not limited herein. The mini-slot includes a plurality of symbols.

In this embodiment of this application, the first signaling may be control information or higher layer signaling. For example, the control information may be downlink control information DCI or uplink control information UCI. For example, the higher layer signaling may be radio resource control RRC signaling, media access control control element MAC CE signaling, or the like. This is not limited herein.

In this embodiment of this application, if the first signaling is the DCI or the UCI, a transmission period of the first signaling is short and a frequency is high. If the first signaling is the RRC signaling, an amount of data that can be transmitted based on the first signaling is large, and transmission reliability is high. If the first signaling is the MAC CE signaling, transmission frequency of the first signaling is higher than that of the RRC signaling, and transmission reliability is higher than that of the DCI or the UCI.

In an example, before step 401, the method may further include:

400: The network device determines start time units and/or lengths of the plurality of DRX cycles.

For example, the network device may determine the start time units and/or the lengths of the plurality of DRX cycles by using any one of the following methods. For example, an XR video frame with a frame rate of 60 fps is used as an example for description.

Method 1: Determine the Start Time Units of the DRX Cycles Based on a Correspondence First, the network device may determine, at the frame rate of 60 fps, that the service information period T is 1/60 s=16.67 ms. The network device determines, based on the period T of 1/60 s (16.67 ms), a least common multiple of the period T and 1 ms, that is, 50 ms, and uses 50 ms as a length of a DRX period. Therefore, the length of one DRX period is equal to three periods T. Correspondingly, three DRX cycles are configured in one DRX period, so that a sum of lengths of the three DRX cycles is equal to the length of the DRX period. As long as the configuration of three DRX cycles in one DRX period is determined, configuration of another DRX period may be determined based on the configuration of the three DRX cycles. In the three DRX cycles, a length of one DRX cycle is different from lengths of the other two DRX cycles.

In this application, a length of a DRX cycle is an integer multiple of time units. For example, a length 16 ms of a first DRX cycle is 16 time units (ms). To ensure that the length of the DRX period is equal to both a sum of lengths of n DRX cycles and is also equal to lengths of n periods T, it needs to be ensured that the length of the DRX period is an integer multiple of the time unit and an integer multiple of the period T. Therefore, the length of the DRX period is determined based on a least common multiple of the period T and the time unit.

Then, the network device determines start time units of three DRX cycles in one DRX period based on a start offset startoffset and the period T.

The network device may determine a start time unit of an $n^{th}$ DRX cycle in the DRX period according to Formula 1:

$$\text{start time unit of the } n^{th} \text{ DRX cycle} = \text{fun}[T(n-1)] + \text{startoffset} \quad \text{(Formula 1), where}$$

fun indicates a rounding function, and may be specifically a round-up function, a round-down function, a round-off function, or the like; T is the foregoing period T; startoffset indicates a start time unit of the n DRX cycles, that is, a start time unit of a first DRX cycle in the n DRX cycles; and n is a positive integer. In this application, startoffset is also referred to as a start offset. For example, when fun is rounding up, startoffset=0 ms and the period T=(1000/60) ms are substituted into Formula 1 for calculation, it may be determined that start time units of the three DRX cycles in the DRX period are sequentially: {0 ms, 17 ms, 34 ms}.

Formula 1 reflects a correspondence between the start time unit of the $n^{th}$ DRX cycle in the DRX period, the start offset startoffset, and the period T. It should be noted that, in this application, Formula 1 is merely an example of the foregoing correspondence, and does not constitute a limitation on the foregoing correspondence. For example, Formula 1 may be modified or improved, or an obtained formula may be used in a table form to determine the start time unit of the $n^{th}$ DRX cycle in the DRX period based on the start offset startoffset and the period T.

For example, assuming that startoffset is 0 ms and the frame rate is 60 fps, the start time unit of the $n^{th}$ DRX cycle in the DRX period may be determined by querying Table 1.

TABLE 1

| Frame rate | Order n of a DRX cycle in a DRX period | Start time unit of a DRX cycle |
|---|---|---|
| 60 fps | 1 | 0 ms |
| | 2 | 17 ms |
| | 3 | 34 ms |

Table 1 shows start time units of n DRX cycles in a DRX period when the frame rate of the service information is 60 fps. For example, in a case of another frame rate, the start time units of the n DRX cycles in the DRX period may be determined based on Table 2. When the frame rate is 90 fps, n is 9.

TABLE 2

| Frame rate/fps | DRX period/ms | Start time units of n DRX cycles in a DRX period/ms |
|---|---|---|
| 30 | 100 | {0, 33, 66} |
| 60 | 50 | {0, 16, 33} |
| 90 | 100 | {0, 11, 22, 33, 44, 55, 66, 77, 88} |
| 120 | 25 | {0, 8, 16} |

Because there is a correspondence between the frame rate and the period T of the service information, the frame rate may reflect a value of the period T in Formula 1. Therefore, Table 1 and Table 2 reflect the correspondence reflected in Formula 1.

It should be noted that tables (Table 1 to Table 8) listed in this application are merely examples of content included in the tables. For example, Table 1 may further include content such as the period T, or Table 2 does not include the frame rate but is replaced by the period T. Therefore, content in the tables is not specifically limited in this application.

It should be noted that, although other manners such as a table are different from a representation form of Formula 1, all manners reflect a same correspondence between the start time unit of the $n^{th}$ DRX cycle in the DRX period, the start offset startoffset, and the period T. In other words, the start time unit of the $n^{th}$ DRX cycle in the same DRX period may be determined in different determining manners (Formula 1, Table 1, Table 2, or the like) based on the same start offset startoffset and the period T.

Method 2: Determine the Lengths of the DRX Cycles Based on the Correspondence

First, the network device may determine, based on the method for determining the period T of the service information described in the foregoing method 1, that the period T=16.67 ms, the length of the DRX period=50 ms, and a quantity of DRX cycles in the DRX period=3.

Then, the network device determines lengths of three DRX cycles in one DRX period based on the period T.

For example, the network device may determine a length of the $n^{th}$ DRX cycle in the DRX period according to Formula 2:

$$\text{length of the } n^{th} \text{ DRX cycle} = \text{fun}(T \times n) - \text{fun}[T(n-1)] \quad \text{(Formula 2), where}$$

fun indicates a rounding function, and for a specific value, refer to the description of Formula 1; T is a period; and n is a positive integer. For example, when fun is rounding up, the period T=16.67 ms is substituted into Formula 2 for calculation, and it may be determined that the lengths of the three DRX cycles in the DRX period are successively: {17 ms, 17 ms, 16 ms}.

Formula 2 reflects a correspondence between the length of the $n^{th}$ DRX cycle in the DRX period and the period T. It should be noted that, in this application, Formula 2 is merely an example of the foregoing correspondence, and does not constitute a limitation on the foregoing correspondence. For example, Formula 2 may be modified or improved, or an obtained formula may be used in a table form to determine the length of the $n^{th}$ DRX cycle in the DRX period based on the period T.

For example, assuming that the frame rate is 60 fps, the length of the $n^{th}$ DRX cycle in the DRX period may be determined by querying Table 3.

TABLE 3

| Frame rate | Order n of a DRX cycle in a DRX period | Length of a DRX cycle |
|---|---|---|
| 60 fps | 1 | 17 ms |
| | 2 | 17 ms |
| | 3 | 16 ms |

Table 3 shows the lengths of the n DRX cycles in the DRX period when the frame rate of the service information is 60 fps. For example, in a case of another frame rate, the lengths of the n DRX cycles in the DRX period may be determined based on Table 4.

TABLE 4

| Frame rate/fps | Length of a DRX period/ms | Order n of a DRX cycle in a DRX period | Length of a DRX cycle/ms |
|---|---|---|---|
| 30 | 100 | 1 | 0 |
| | | 2 | 33 |
| | | 3 | 66 |
| 60 | 50 | 1 | 0 |
| | | 2 | 16 |
| | | 3 | 33 |
| 90 | 100 | 1 | 0 |
| | | 2 | 11 |
| | | 3 | 22 |
| | | 4 | 33 |
| | | 5 | 44 |
| | | 6 | 55 |
| | | 7 | 66 |
| | | 8 | 77 |
| | | 9 | 88 |
| 120 | 25 | 1 | 0 |
| | | 2 | 8 |
| | | 3 | 16 |

Because there is a correspondence between the frame rate and the period T of the service information, the frame rate may reflect a value of the period T in Formula 2. Therefore, Table 3 and Table 4 reflect the correspondence reflected in Formula 2.

It should be noted that, although other manners such as a table are different from a representation form of Formula 2, all manners reflect a same correspondence between the length of the $n^{th}$ DRX cycle in the DRX period and the period T. In other words, the length of the $n^{th}$ DRX cycle in the same DRX period may be determined in different determining manners (Formula 2, Table 3, Table 4, or the like) based on the same period T.

Method 3: Determine a Length of Each DRX Cycle Based on a First Period Length Shared by the Plurality of DRX Cycles and a Length Offset of Each DRX Cycle In the method 3, a sum of the first period length and a length offset corresponding to an $n^{th}$ DRX cycle is equal to a length of the $n^{th}$ DRX cycle in the DRX period, where n is a positive integer. Therefore, a difference in lengths of DRX cycles in the DRX period depends on a difference in length offsets corresponding to the DRX cycles.

For example, the network device may determine, according to the foregoing method and a frame rate of 60 fps, a period T=16.67 ms, a length of the DRX period=50 ms, and a quantity n of DRX cycles in the DRX period=3. The network device determines the first period length and the length offsets corresponding to the three DRX cycles in the DRX period. Because the period T is 16.67 ms, the network device may determine that the first period length is an integer close to the period T, for example, 16 ms or 15 ms. It is assumed that the first period length is determined to be 16 ms. It is determined, based on the length of the DRX period 50 ms and the first period length 16 ms, that a sum of length offsets corresponding to the three DRX cycles in the DRX period=50 ms−3×16 ms=2 ms. Then, it is determined that length offsets corresponding to the three DRX cycles in the DRX period are successively: {1 ms, 1 ms, 0 ms}. In n length offsets corresponding to the n DRX cycles in the DRX period, at least two length offsets have different lengths. It should be noted that the length offsets {1 ms, 1 ms, 0 ms} are examples of the three length offsets in the DRX period. In addition to {1 ms, 1 ms, 0 ms}, the three length offsets in the DRX period may alternatively be an arrangement of other values, for example, {1 ms, 0 ms, 1 ms}, or {0 ms, 1 ms, 1 ms}. This is not limited herein. Then, the network device determines the lengths of the three DRX cycles in the DRX period based on the first period length and the length offsets corresponding to the three DRX cycles in the DRX period.

For example, in this application, the first period length of the DRX period and the length offsets of n DRX cycles in the DRX period may also be determined by querying a table. For example, the table may be shown in Table 5.

TABLE 5

| Frame rate/fps | Length of a DRX period/ms | First period length/ms | Length offsets of n DRX cycles in a DRX period/ms |
|---|---|---|---|
| 30 | 100 | 33 | {0, 0, 1} |
| 60 | 50 | 16 | {0, 1, 1} |
| 90 | 100 | 11 | {0, 0, 0, 0, 0, 0, 0, 0, 1} |
| 120 | 25 | 8 | {0, 0, 1} |

Content in Table 5 is an example of the first period length and the n length offsets in the DRX period, and does not limit values of the first period length and the length offsets. In addition to the values shown in Table 5, the first period length and the n length offsets may alternatively be other values. This is not limited herein.

Method 4: Determine a Start Time Unit of an $m^{th}$ DRX Cycle Based on the First Period Length and Length Offsets of First (m−1) DRX Cycles, where m is an Integer Greater than 1

For example, a sum of the first period length and a length offset corresponding to an $n^{th}$ DRX cycle is equal to a length of the $n^{th}$ DRX cycle.

For example, the network device may determine, according to the foregoing method, by using a frame rate of 60 fps as an example, the period T=16.67 ms, the length of the DRX period=50 ms, and a quantity of DRX cycles in the DRX period=3. The network device may determine, in the manner in the foregoing method 3, the first period length and the length offsets corresponding to the three DRX cycles in the DRX period. The network device determines, based on the first period length and the length offsets of the first (m−1) DRX cycles in the DRX period, the start time unit of the $m^{th}$ DRX cycle in the DRX period. The start time unit of the $m^{th}$ DRX cycle may be determined based on the first period length, the length offsets corresponding to the first (m−1) DRX cycles, and a correspondence shown in Formula 3 or Formula 4:

$$\text{start time unit of the } m^{th} \text{ } DRX \text{ cycle} = \sum_{i=1}^{m-1}(\text{length offset}_i + \text{first period length}) \quad \text{(Formula 3)}$$

$$\text{start time unit of the } m^{th} \text{ } DRX \text{ cycle} = \left[\sum_{i=1}^{m-1}(\text{length offset}_i + \text{first period length})\right] + startoffset \quad \text{(Formula 4)}$$

startoffset indicates a start time unit of the n DRX cycles, in other words, a start time unit of a first DRX cycle in the n DRX cycles. In other words, the start time unit of the m$^{th}$ DRX cycle is equal to a sum of lengths of the first (m−1) DRX cycles, or is equal to a sum of the lengths of the first (m−1) DRX cycles and the start offset startoffset, where m is an integer greater than 1. For example, if the start offset startoffset=0 ms, the first period length=16 ms, and the length offsets corresponding to the DRX cycles in the DRX period={1 ms, 1 ms, 0 ms} are substituted into Formula 4 for calculation. It may be determined that the start time units of the three DRX cycles in the DRX period are successively: {0 ms, 17 ms, 34 ms} (the start time unit of the first DRX cycle=startoffset=0 ms).

If the start time unit of the DRX cycle represents a relative time offset relative to the start time unit of the first DRX cycle, the start time unit of the first DRX cycle is 0, and the start time unit of the m$^{th}$ DRX cycle meets the correspondence shown in Formula 3. If the start time unit of the DRX cycle represents an absolute time offset, the start time unit of the first DRX cycle is the start offset startoffset, and the start time unit of the m$^{th}$ DRX cycle meets the correspondence shown in Formula 4.

Formula 3 and Formula 4 reflect a correspondence between the start time unit of the m$^{th}$ DRX cycle in the DRX period, the start offset startoffset, the period T, and length offsets of the first (m−1) DRX cycles. It should be noted that in this application, Formula 3 and Formula 4 are merely examples of the foregoing correspondence, and do not constitute a limitation on the foregoing correspondence. For example, Formula 3 or Formula 4 may be modified or improved, and an obtained formula is used to determine the start time unit of the m$^{th}$ DRX cycle in the DRX period based on the start offset startoffset, the period T, and the length offsets of the first (m−1) DRX cycles.

It should be noted that in this application, Formula 3 and Formula 4 are merely examples of representation forms of the foregoing correspondence. In addition to Formula 3 and Formula 4, the correspondence may alternatively have another representation form, for example, a table. This is not limited herein.

For example, assuming that startoffset is 0 ms, the start time unit of the n$^{th}$ DRX cycle in the DRX period may be determined by querying Table 6.

TABLE 6

| Frame rate/fps | Length of a DRX period/ms | Start time units of n DRX cycles in a DRX period/ms |
|---|---|---|
| 30 | 100 | {0, 33, 66} |
| 60 | 50 | {0, 16, 33} |

TABLE 6-continued

| Frame rate/fps | Length of a DRX period/ms | Start time units of n DRX cycles in a DRX period/ms |
|---|---|---|
| 90 | 100 | {0, 11, 22, 33, 44, 55, 66, 77, 88} |
| 120 | 25 | {0, 8, 16} |

It should be noted that, although other manners such as a table are different from a representation form of Formula 3 or Formula 4, all manners reflect a same correspondence between the start time unit of the m$^{th}$ DRX cycle in the DRX period and the lengths of the first (m−1) DRX cycles. In other words, the start time unit of the m$^{th}$ DRX cycle in the same DRX period may be determined in different determining manners (Formula 3, Formula 4, Table 6, or the like) based on the lengths of the first (m−1) DRX cycles.

Method 5: Determine the Lengths and/or the Start Time Units of the DRX Cycles in Another Manner In the method 5, the network device may determine the lengths and/or the start time units of the DRX cycles by using a method other than the foregoing methods 1 to 4. For example, the network device determines the length of each DRX cycle based on a DRX cycle length expected by the terminal device. In addition, the length of each DRX cycle may alternatively be determined in another manner, for example, may be determined based on the service period T, based on feedback information, or based on measurement information. This is not limited herein.

For example, the network device may determine, according to the manner in the method 1, by using a frame rate of 60 fps as an example, that the period T=16.67 ms, the length of the DRX period=50 ms, and the quantity of DRX cycles in the DRX period=3. The network device determines target configuration information such as feedback information and measurement information. The network device determines lengths and/or start time units of three DRX cycles in one DRX period based on the target configuration information such as the feedback information and the measurement information.

For example, a determining manner in the method 5 may be an expectation value, feedback information, measurement information, or the like from another device. A manner of determining the DRX cycle is flexible and diversified, and has high scalability.

For example, the network device may predict, based on signal strength fed back by the terminal device, a time at which the service information is transmitted to the terminal device, to determine the DRX cycle. Alternatively, the network device may determine a delay, a packet loss rate, and the like of the terminal device based on a measurement signal, to determine the DRX cycle. These methods do not need to be implemented according to a complex algorithm, and can reduce a computing power burden of the network device. In addition, an existing communication mechanism (feedback and measurement) is reused, and a change to a communications system is small, and adaptability is high.

Figure 5B:
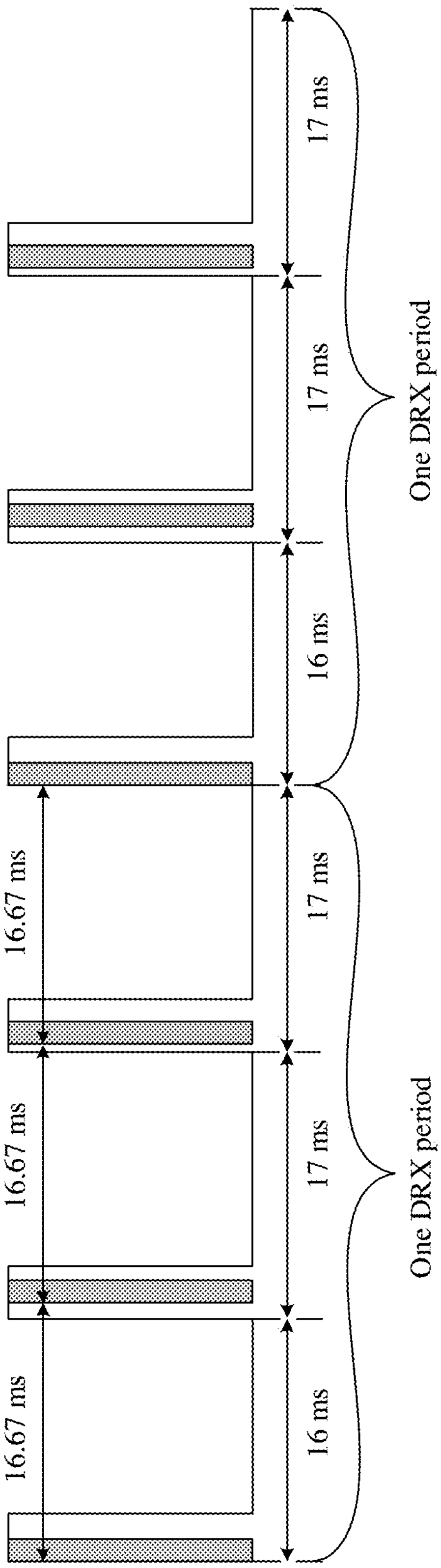
FIG. 5*b* is another schematic diagram of a communication method according to an embodiment of this application.

Method 6: Determine the Lengths and/or the Start Time Units of the DRX Cycles Based on a Second Period Length and a First Offset of Each DRX Period As shown in FIG. 5*b*, the DRX period in the first five methods includes three consecutive DRX cycles, and different DRX periods have a same configuration except a start time unit.

Figure 5C:
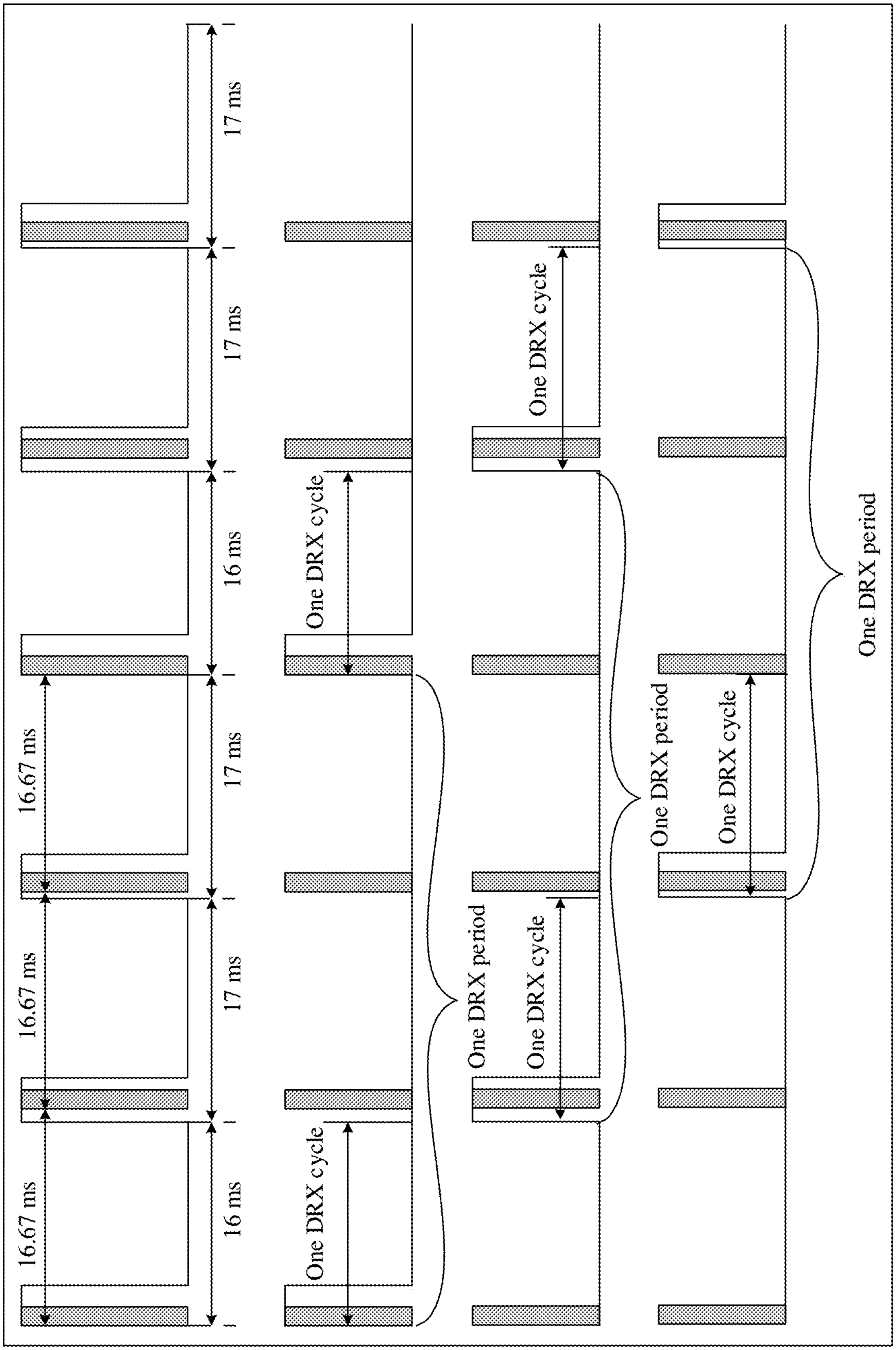
FIG. 5*c* is another schematic diagram of a communication method according to an embodiment of this application.

As shown in FIG. 5*c*, different from the foregoing five methods, a DRX period in the method 6 is determined based on three different configurations, and three DRX periods based on the different configurations overlap in time. Lengths of the DRX periods with three configurations are the same, and each DRX period includes one DRX cycle. In a time range whose duration is the length of the DRX period (for example, within 50 ms occupied by a first DRX period in FIG. 5*c*), three DRX cycles are included, and the three DRX cycles belong to three different DRX periods. Lengths of a plurality of DRX periods in the method 6 are also referred to as the second period length.

For example, the network device may determine, according to the method in the method 1, by using a frame rate of 60 fps as an example, the period T=16.67 ms, the length of the DRX period (second period length)=50 ms, and a quantity of DRX periods with different configurations=3. The network device determines start time units of the three DRX periods with different configurations, in other words, determines first offsets of the three DRX periods. The network device determines that a first offset of a first DRX period is 0 ms; determines that a first offset of a second DRX period is an integer close to the period T=16.67 ms, for example, 17 ms; and determines that a first offset of a third DRX period is a sum of an integer close to the period T=16.67 ms and the first offset of the second DRX cycle, for example, 16 ms+17 ms=33 ms (17 ms is the first offset of the second DRX cycle). The network device determines the length and/or the start time unit of each DRX cycle based on the second period length and the first offset of each DRX period. A length of the first DRX cycle is the first offset 17 ms of the second DRX period. A length of the second DRX cycle is equal to a difference between the first offset of the third DRX period and the first offset of the second DRX cycle=33 ms−17 ms=16 ms. A length of the third DRX cycle is a difference between the second period length and the first offset of the third DRX cycle=50 ms−33 ms=17 ms. A start time unit of the first DRX cycle is a start offset startoffset (for example, 0 ms). A start time unit of the second DRX cycle is a sum of the start offset startoffset and the first offset of the second DRX period=0 ms+17 ms=17 ms. A start time unit of the third DRX cycle is a sum of the start offset startoffset and the first offset of the third DRX period=0 ms+33 ms=33 ms.

It should be noted that, in addition to {0 ms, 17 ms, 33 ms} in the foregoing example, the first offsets may alternatively be an arrangement of other values, for example, {0 ms, 16 ms, 33 ms}, {0 ms, 17 ms, 34 ms}, or the like. This is not limited herein.

In this embodiment of this application, in addition to being represented by the foregoing sequence, the first offsets may alternatively be represented in another form, for example, a table. This is not limited herein.

For example, the second period length and the first offset of each DRX cycle may be determined by querying Table 7.

TABLE 7

| Frame rate/fps | Sequence number of a DRX period | Second period length/ms | First offset/ms |
|---|---|---|---|
| 30 | 1 | 100 | 0 |
| | 2 | | 33 |
| | 3 | | 66 |
| 60 | 1 | 50 | 0 |
| | 2 | | 16 |
| | 3 | | 33 |
| 90 | 1 | 100 | 0 |

TABLE 7-continued

| Frame rate/fps | Sequence number of a DRX period | Second period length/ms | First offset/ms |
|---|---|---|---|
| | 2 | | 11 |
| | 3 | | 22 |
| | 4 | | 33 |
| | 5 | | 44 |
| | 6 | | 55 |
| | 7 | | 66 |
| | 8 | | 77 |
| | 9 | | 88 |
| 120 | 1 | 25 | 0 |
| | 2 | | 8 |
| | 3 | | 16 |

It should be noted that content in Table 7 is an example of the second period length and the first offsets in the DRX period, and does not limit values of the second period length and the first offsets. In addition to the values shown in Table 7, the second period length and the first offset may alternatively be other values. This is not limited herein.

Method 7: Determine the Lengths and/or the Start Time Units of the DRX Cycles Based on the Second Period Length and the First Offset of Each DRX Cycle In the method 7, the DRX period is determined based on one type of configuration information. The DRX cycle represents a plurality of segments in one DRX period, and the second period length represents a length of the DRX period. One DRX period consists of three consecutive segments. Each segment includes at least one active period. Optionally, the segment may include a sleep period. The three segments are equivalent to DRX cycles in methods 1 to 5. Therefore, segments in the DRX period may also be referred to as DRX cycles.

For example, the network device may determine, according to the frame rate of 60 fps, the period T=16.67 ms, the length of the DRX period (second period length)=50 ms, and a quantity of segments (DRX cycles) in the DRX period=3. For details, refer to the description in the method 1, and details are not described herein again. The network device determines a start time unit of each segment in the DRX period, in other words, determines a first offset of each segment. The network device determines that a first offset of a first segment in the DRX period is 0 ms; determines that a first offset of a second segment is an integer close to the period T=16.67 ms, for example, 17 ms; and determines that a first offset of a third segment is a sum of an integer close to the period T=16.67 ms and the first offset of the second segment, for example, 16 ms+17 ms=33 ms (17 ms is the first offset of the second segment). The network device determines the length and/or the start time unit of each DRX cycle based on the second period length and the first offset of each segment in the DRX period. A length of the first DRX cycle is the first offset 17 ms of the second segment in the DRX period. A length of the second DRX cycle is equal to a difference between the first offset of the third segment and the first offset of the second segment=33 ms−17 ms=16 ms. A length of the third DRX cycle is a difference between the second period length and the first offset of the third segment=50 ms−33 ms=17 ms. A start time unit of the first DRX cycle is a start offset startoffset (for example, 0 ms). A start time unit of the second DRX cycle is a sum of the start offset startoffset and the first offset of the second segment=0 ms+17 ms=17 ms. A start time unit of the third DRX cycle is a sum of the start offset startoffset and the first offset of the third segment=0 ms+33 ms=33 ms.

It should be noted that, in addition to {0 ms, 17 ms, 33 ms} in the foregoing example, the first offsets may alternatively be an arrangement of other values, for example, {0 ms, 16 ms, 33 ms}, {0 ms, 17 ms, 34 ms}, or the like. This is not limited herein.

In this embodiment of this application, in addition to being represented by the foregoing sequence, the first offsets may alternatively be represented in another form, for example, a table. This is not limited herein.

For content included in the table, refer to Table 7 in the method 6. Different from the method 6, in the method 7, the first offset item in Table 7 refers to respective start time units of a plurality of segments in one DRX period.

Figure 5D:
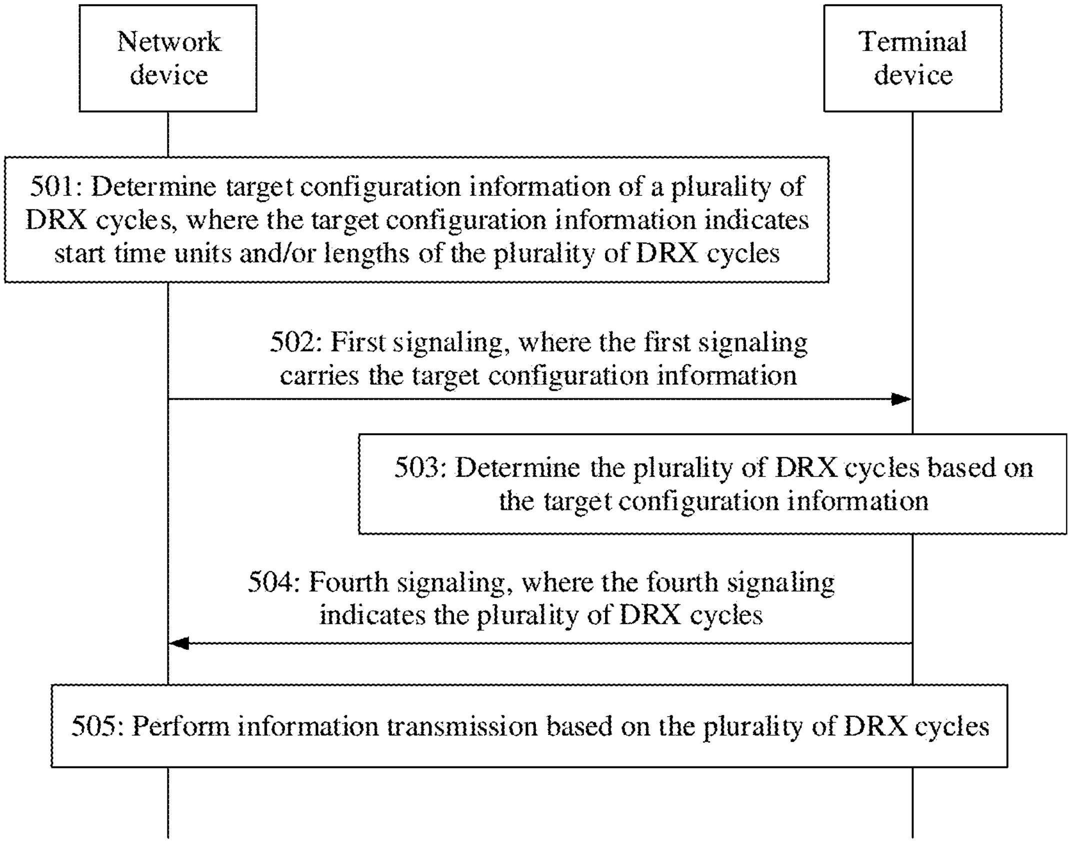
FIG. 5*d* is another flowchart of a communication method according to an embodiment of this application.

Refer to FIG. 5*d*. An embodiment of this application provides a schematic flowchart of a communication method. The method may be performed by a terminal device and a network device, or may be performed by a chip in the terminal device and a chip in the network device. The network device in FIG. 4 may be the access network device 120 in FIG. 1, and the terminal device may be the terminal device 110 in FIG. 1. The method shown in FIG. 4 may include the following operations.

501: The network device determines target configuration information.

The target configuration information reflects configurations of a plurality of DRX cycles. In subsequent steps, values of start time units and/or lengths of the plurality of DRX cycles may be determined based on the target configuration information. For example, in the method 1 in step 400, the target configuration information is a start offset startoffset and a period T. In subsequent steps, the start time units of the plurality of DRX cycles may be determined based on the start offset startoffset and the period T.

502: The network device sends first signaling, where the first signaling carries the target configuration information. Correspondingly, the terminal device receives the first signaling.

Step 502 corresponds to step 401 in FIG. 1, and a difference lies in that the first signaling in step 401 carries the start time units and/or the lengths of the plurality of DRX cycles, while the first signaling in step 502 carries the target configuration information.

503: The terminal device determines the start time units and/or the lengths of the plurality of DRX cycles based on the target configuration information.

The terminal device determines the start time units and/or the lengths of the plurality of DRX cycles based on the target configuration information. For example, in the method 1, the terminal device may determine the start time units of the plurality of DRX cycles based on the target configuration information (the start offset startoffset and the period T) carried in the first signaling and a correspondence shown in Formula 1, Table 1, or Table 2.

504: The terminal device sends fourth signaling, where the fourth signaling indicates the start time units and/or the lengths of the plurality of DRX cycles. Correspondingly, the network device receives the fourth signaling.

505: The network device and the terminal device perform information transmission based on the plurality of DRX cycles.

From a perspective of the network device, in the solution shown in FIG. 5*d*, the network device needs to determine only the target configuration information, and does not need to determine the start time units and/or the lengths of the plurality of DRX cycles based on the target configuration information. Compared with the solution shown in FIG. 4, the solution saves computing resources of the network device.

Similar to step 400 in FIG. 4, steps 501 to 503 also include a plurality of methods.

Method a

501: The network device determines target configuration information, where the target configuration information includes at least a start offset startoffset and a period T.

For a specific determining method, refer to the method 1 in step 400. Details are not described herein again.

502: The network device sends first signaling, where the first signaling carries the target configuration information. Correspondingly, the terminal device receives the first signaling.

503: The terminal device determines start time units of a plurality of DRX cycles in one DRX period based on the start offset startoffset and the period T.

For a specific determining method, refer to the method 1 in step 400. Details are not described herein again.

Method b

501: The network device determines target configuration information, where the target configuration information includes at least a period T.

For a specific determining method, refer to the method 2 in step 400. Details are not described herein again.

502: The network device sends first signaling, where the first signaling carries the target configuration information. Correspondingly, the terminal device receives the first signaling.

503: The terminal device determines lengths of a plurality of DRX cycles in one DRX period based on the period T.

For a specific determining method, refer to the method 2 in step 400. Details are not described herein again.

In the method b, the first signaling in a downlink direction indicates the target configuration information (the period T), and a data amount of the first signaling is small. This saves communication resources in the downlink direction.

Method c

501: The network device determines target configuration information, where the target configuration information includes at least a first period length and a length offset of each DRX cycle.

For a specific determining method, refer to the method 3 in step 400. Details are not described herein again.

502: The network device sends first signaling, where the first signaling carries the target configuration information. Correspondingly, the terminal device receives the first signaling.

503: The terminal device determines lengths of a plurality of DRX cycles in a DRX period based on the first period length and the length offset of each DRX cycle.

For a specific determining method, refer to the method 3 in step 400. Details are not described herein again.

In the method c, first period lengths of the plurality of DRX cycles are the same, and a difference between lengths of the DRX cycles depends on the length offsets corresponding to the DRX cycles. Therefore, the first period length needs to be carried in the first signaling only once or a few times. The first period length occupies a large quantity of bytes, and the length offset occupies a small quantity of bytes. This can reduce a data amount of the first signaling, and further save communication resources in a downlink direction.

Method d

501: The network device determines target configuration information, where the target configuration information includes at least a first period length and a length offset of each DRX cycle.

For a specific determining method, refer to the method 4 in step 400. Details are not described herein again.

502: The network device sends first signaling, where the first signaling carries the target configuration information. Correspondingly, the terminal device receives the first signaling.

503: The terminal device determines a start time unit of an $m^{th}$ DRX cycle in a DRX period based on the first period length and length offsets of first (m−1) DRX cycles in the DRX period.

For a specific determining method, refer to the method 4 in step 400. Details are not described herein again.

If the method d is combined with the method c, to be specific, the first signaling carries the first period length and the length offsets of the plurality of DRX cycles, both the length of the DRX cycle and the start time unit of the DRX cycle can be determined based on the first period length and the length offsets of the plurality of DRX cycles.

Method e

501: The network device determines target configuration information, where the target configuration information includes at least feedback information and measurement information.

For a specific determining method, refer to the method 5 in step 400. Details are not described herein again.

502: The network device sends first signaling, where the first signaling carries the target configuration information. Correspondingly, the terminal device receives the first signaling.

503: The terminal device determines lengths and/or start time units of a plurality of DRX cycles in one DRX period based on the feedback information and the measurement information.

For a specific determining method, refer to the method 5 in step 400. Details are not described herein again.

Method f

501: The network device determines target configuration information, where the target configuration information includes at least a second period length and a first offset of each DRX cycle.

For a specific determining method, refer to the method 6 in step 400. Details are not described herein again.

502: The network device sends first signaling, where the first signaling carries the target configuration information. Correspondingly, the terminal device receives the first signaling.

503: The terminal device determines a length and/or a start time unit of each DRX cycle based on the second period length and the first offset of each DRX cycle.

For a specific determining method, refer to the method 6 in step 400. Details are not described herein again.

Method g

501: The network device determines target configuration information, where the target configuration information includes at least a second period length and a first offset of each segment in a DRX period.

For a specific determining method, refer to the method 7 in step 400. Details are not described herein again.

502: The network device sends first signaling, where the first signaling carries the target configuration information. Correspondingly, the terminal device receives the first signaling.

503: The terminal device determines a length and/or a start time unit of each DRX cycle based on the second period length and the first offset of each segment in the DRX period.

Method h

501: The network device determines target configuration information, where the target configuration information includes at least a period T.

For a specific determining method, refer to the method 2 in step 400. Details are not described herein again.

502: The network device sends first signaling, where the first signaling carries the target configuration information. Correspondingly, the terminal device receives the first signaling.

503: The terminal device determines lengths and/or start time units of a plurality of DRX cycles in one DRX period based on the period T.

For a specific determining method, refer to any method in the method 1 to the method 7 in step 400. Details are not described herein again.

For ease of understanding and comparison of the foregoing seven methods, the seven methods are summarized and described in Table 8.

TABLE 8

| | Period of service information T = 16.67 ms | Lengths of DRX cycles: {17 ms, 17 ms, 16 ms} | Start time units of DRX cycles: {0 ms, 17 ms, 34 ms} |
|---|---|---|---|
| | Content indicated by first signaling | | |
| Frame rate of service information = 60 fps Method | FIG. 5b: Target configuration information | Example of the target configuration information | FIG. 4: Determined result |
| Method 1 | Start offset startoffset and a period T<br>Period T | {0 ms, 17 ms, 34 ms} and T = 16.67 ms<br>T = 16.67 ms | Start time unit of each DRX cycle in a DRX period |

TABLE 8-continued

| | Period of service information T = 16.67 ms | Lengths of DRX cycles: {17 ms, 17 ms, 16 ms} | Start time units of DRX cycles: {0 ms, 17 ms, 34 ms} |
|---|---|---|---|
| | Content indicated by first signaling | | |
| Frame rate of service information = 60 fps Method | FIG. 5b: Target configuration information | Example of the target configuration information | FIG. 4: Determined result |
| Method 2 | Period T | T = 16.67 ms | Length of each DRX cycle in a DRX period |
| Method 3 | First period length and a length offset of each DRX cycle<br>Period T | {16 ms} + {1 ms, 1 ms, 0 ms}<br>T = 16.67 ms | Start time unit and/or a length of each DRX cycle in a DRX period |
| Method 4 | First period length and length offsets of first (m-1) DRX cycles<br>Period T | {16 ms} + {1 ms, 1 ms, 0 ms}<br>T = 16.67 ms | Start time unit of an $m^{th}$ DRX cycle |
| Method 5 | Feedback information, measurement information, and the like<br>Period T | Feedback information, measurement information, and the like<br>T = 16.67 ms | Start time unit and/or a length of each DRX cycle in a DRX period |
| Method 6 | Second period length and a first offset of each DRX cycle<br>Period T | 50 ms + {0 ms, 17 ms, 34 ms}<br>T = 16.67 ms | Start time unit and/or a length of each DRX cycle in each DRX period |
| Method 7 | Second period length and a first offset of each DRX cycle<br>Period T | 50 ms + {0 ms, 17 ms, 34 ms}<br>T = 16.67 ms | Start time unit and/or a length of each segment (DRX cycle) in a DRX period |

It should be noted that, in this embodiment of this application, the DRX period is merely an example of an existence status of the DRX cycle. Alternatively, the DRX cycle may exist independently, to be specific, the DRX cycle may not be divided based on the DRX period.

In this embodiment of this application, all information related to time or duration that appears in a same method and information related to time or duration that is included in corresponding first signaling are based on a same time unit. The method 1 is used as an example. Time units of the start time unit of the $n^{th}$ DRX cycle, the period T, and the start offset startoffset in the method 1, and the start time unit of each DRX cycle included in the first signaling corresponding to the method 1 are all ms.

In addition to ms, all information related to time or duration that appears in a same method may be based on another time unit, for example, a second, a subframe, a slot, a mini-slot, and a symbol. This is not limited herein.

It should be noted that the seven methods listed in embodiments of this application are examples of methods for determining DRX cycles with different lengths, but are not exhaustive of the methods. All methods for determining DRX cycles with different lengths may fall within the scope of embodiments of this application.

It should be noted that in the seven methods listed above, some methods are used to determine the length of the DRX cycle, and some methods are used to determine the start time unit of the DRX cycle. Communication between the terminal device and the network device requires alignment of the length and start time unit of the DRX cycle. Therefore, in this application, two methods may be used at the same time. One method is used to determine the length of the DRX cycle, and the other method is used to determine the start time unit of the DRX cycle.

In the foregoing method, DRX cycles of different lengths are configured to match the period T of the service information, so that the length of the DRX cycle matches the period T of the service information. In addition to the foregoing method, the length of the DRX cycle and the time unit of the period T may alternatively be changed, and the length of the DRX cycle may match the period T of the service information based on a changed time unit.

This application further provides a method for resolving a DRX mechanism defect by changing a length of a DRX cycle and a time unit of a period T.

An example in which the frame rate of the XR video frame in FIG. 3 is 60 fps is further described, and the period T is 1000/60 ms=16.67 ms. A time unit of the DRX cycle is ms, and the time unit is ms. The period T is not an integer, and an offset value is large. If another time unit is used for the length of the DRX cycle, the offset value may be reduced, thereby reducing a communication delay and terminal power consumption.

Refer to FIG. 5*a*. Time units of both the length of the DRX cycle and the service period T are ms, and the service period T is 16.67 ms, lengths of three DRX cycles in the DRX period are configured as {16 ms, 17 ms, 17 ms}. In this case, offset values of the three DRX cycles are successively {0 ms, 0.67 ms, 0.34 ms}. In a time period corresponding to the offset values, enabling of a transceiver by the terminal device is invalid, causing a waste of energy of the terminal device. In general, the terminal device wastes 0 ms+0.67 ms+0.34 ms=1.01 ms of energy within 50 ms.

Figure 6:
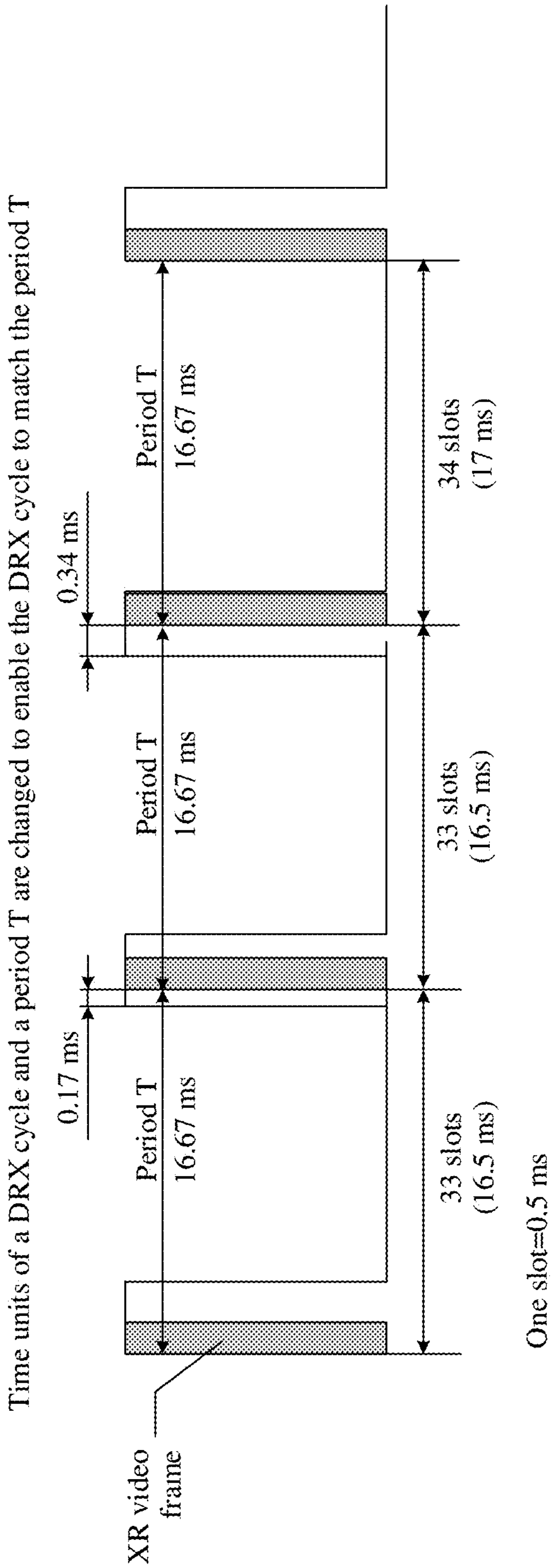
FIG. 6 is another schematic diagram of a communication method according to an embodiment of this application.

Refer to FIG. 6. If a time unit of a length of a DRX cycle is a slot, a subcarrier spacing is 30 kHz, a length of one slot is 0.5 ms, a service period T is 16.67 ms, and lengths of three DRX cycles in the DRX period is {33, 33, 34} slots, and offset values of the three DRX cycles are {0 ms, 0.17 ms, 0.34 ms} in sequence. Therefore, the terminal device wastes 0 ms+0.17 ms+0.34 ms=0.61 ms of energy within 50 ms, and the energy is half of energy consumed when the length of the DRX cycle is in a time unit of ms.

Similarly, when the time unit of the length of the DRX cycle is a symbol or a mini-slot, the length of the DRX cycle is closer to the period of the service information, and additional energy consumption is further reduced. For details about an analysis method for additional energy consumption whose time unit of the length of the DRX cycle is a symbol, refer to the foregoing analysis method for additional energy consumption whose time unit of the length of the DRX cycle is a slot, and details are not described herein again.

In the foregoing description, a length or a time unit of a DRX cycle is adjusted, so as to resolve a problem that the DRX cycle does not match a period of service information. As shown in two lower figures in FIG. 3, if the start time unit of the DRX cycle does not match a time at which the service information is transmitted to the terminal device, a problem that the DRX cycle does not match the service information is also caused. The following describes a method for resolving the problem by updating the start time unit of the DRX cycle provided in this application.

Figure 7:
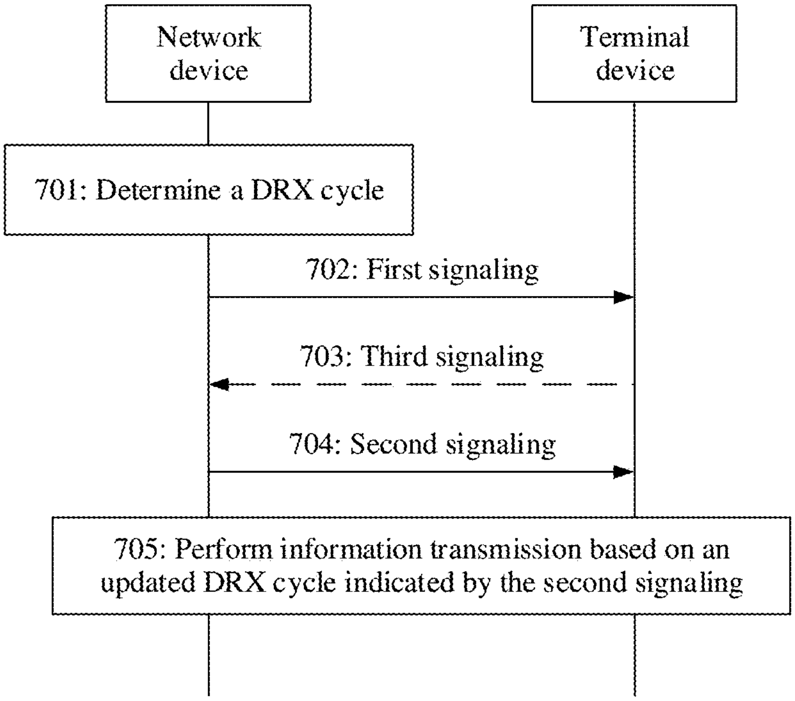
FIG. 7 is another flowchart of a communication method according to an embodiment of this application.

FIG. 7 is a schematic flowchart of a communication method according to an embodiment of this application. The method includes the following steps.

701: A network device determines a start time unit and/or a length of a DRX cycle.

For a specific determining method, refer to step 400 in an embodiment shown in FIG. 4. Details are not described herein again.

702: The network device sends first signaling. Correspondingly, a terminal device receives the first signaling.

For a specific determining method, refer to step 401 in an embodiment shown in FIG. 4. Details are not described herein again.

703: The terminal device sends third signaling. Correspondingly, the network device receives the third signaling.

The terminal device sends the third signaling, where the third signaling indicates a start time unit of the DRX cycle expected by the terminal device. Correspondingly, the network device receives the third signaling.

Optionally, in addition to the start time unit of the DRX cycle expected by the terminal device, content indicated by the third signaling may be other content, for example, a DRX cycle length expected by the terminal device, activation onduration duration expected by the terminal device, or inactive inactivity duration expected by the terminal device. This is not limited herein.

704: The network device sends second signaling. Correspondingly, the terminal device receives the second signaling.

After receiving the third signaling, the network device determines an updated DRX cycle based on information indicated by the third signaling, so that an offset value of the updated DRX cycle is less than an offset value of the DRX cycle indicated by the first signaling. The network device sends the second signaling, where the second signaling indicates the updated DRX cycle.

In this application, the DRX cycle is updated based on the second signaling, to reduce an offset value of the DRX cycle, and reduce a delay and power consumption of the terminal device.

It should be noted that step 703 is an optional step, and step 703 may not be performed. In addition to the third signaling, the network device may determine the updated DRX cycle in another manner, for example, determine the updated DRX cycle based on a current network status or a time at which service information arrives at the network device. This is not limited herein.

705: The network device and the terminal device perform information transmission based on the updated DRX cycle indicated by the second signaling.

After receiving the second signaling, the terminal device may perform information transmission based on the updated DRX cycle indicated by the second signaling. Correspondingly, the network device performs information transmission based on the updated DRX cycle. The following separately describes, based on different content indicated by the third signaling, how the network device determines the updated DRX cycle and an update manner of the DRX cycle.

Update Manner 1: The Start Time Unit of the DRX Cycle Expected by the Terminal Device The start time unit of the DRX cycle expected by the terminal device is used to determine an offset between a start time unit of the updated DRX cycle and a start time unit of the DRX cycle indicated by the first signaling.

Figure 8:
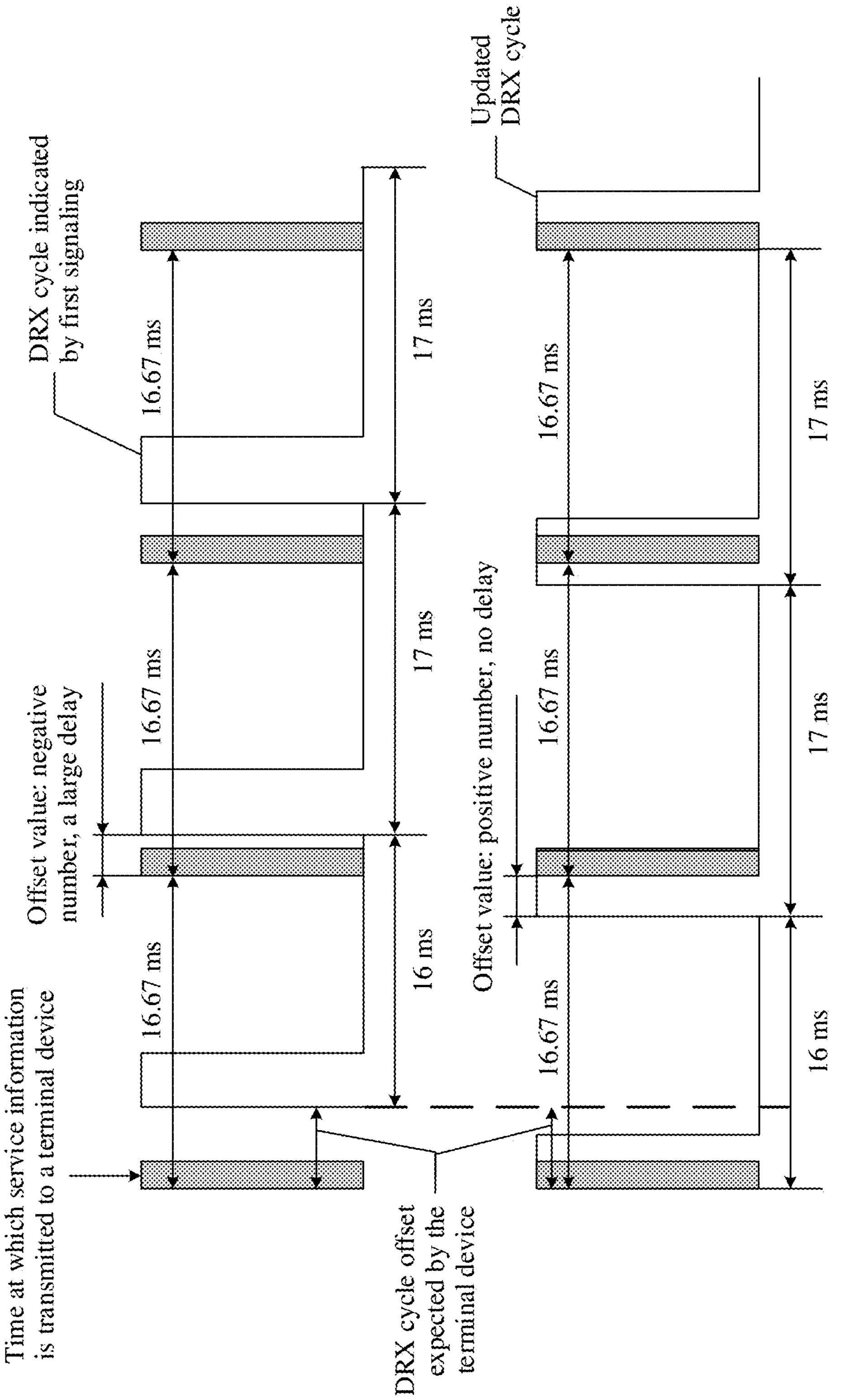
FIG. 8 is another schematic diagram of a communication method according to an embodiment of this application.

For example, as shown in FIG. 8, if a time at which the service information is actually transmitted to the terminal device is earlier than an active period of the DRX cycle indicated by the first signaling, the terminal device may determine an expected DRX cycle offset based on the time at which the service information is transmitted to the terminal device, so that the updated DRX cycle moves toward an earlier time (leftward) on a time axis than the DRX cycle indicated by the first signaling. In this way, the offset value can be changed from a negative number to a positive number, and a delay of waiting time of the service information in a buffer of the terminal device is reduced, thereby reducing a communication delay.

It should be noted that, in FIG. 8, only an example in which the service information arrives in advance is used. If the service information arrives late, an offset of the DRX cycle may be determined, so that the updated DRX cycle moves rightward on the time axis compared with the DRX cycle indicated by the first signaling, to minimize the offset value, reduce invalid activation duration, and reduce power consumption of the terminal device.

Optionally, the updated DRX cycle and the DRX cycle indicated by the first signaling have a same DRX cycle length. The second signaling may indicate the start time unit of the DRX cycle, and the length of the DRX cycle may be determined based on the first signaling. Therefore, the second signaling may not indicate the length of the DRX cycle, thereby reducing a data amount of the second signaling and saving communication resources.

Optionally, the updated DRX cycle and the DRX cycle indicated by the first signaling may have different DRX cycle lengths. This is not limited herein.

This update manner can effectively resolve a problem that an overall DRX cycle is ahead of or behind an actual arrival time of the service information when the actual arrival time of the service information does not match an estimated arrival time.

Update Manner 2: The DRX Cycle Length Expected by the Terminal Device

The DRX cycle length expected by the terminal device is used to determine a length of the updated DRX cycle.

Figure 9:
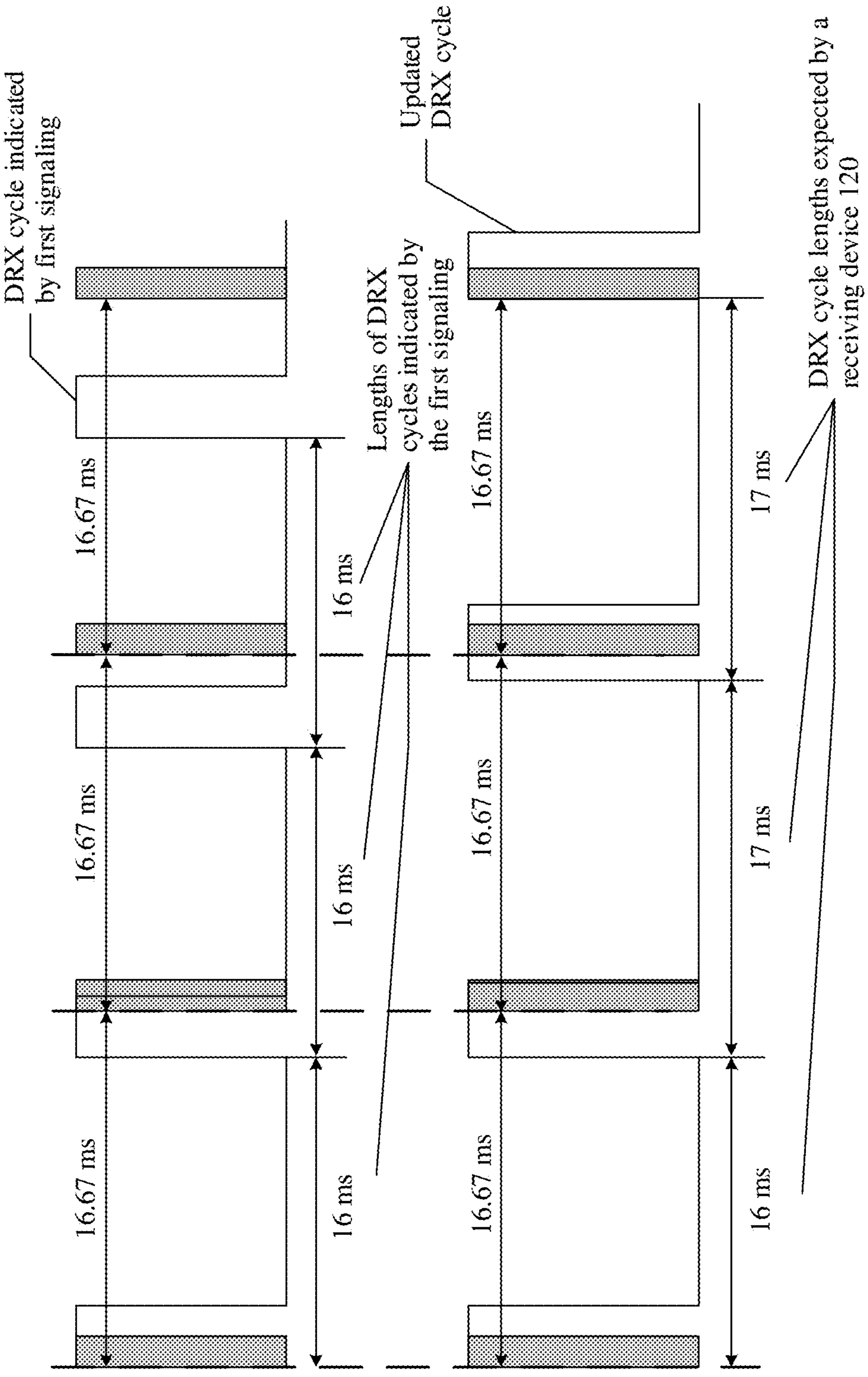
FIG. 9 is another schematic diagram of a communication method according to an embodiment of this application.

For example, as shown in FIG. 9, if a length of the DRX cycle indicated by the first signaling cannot completely match a period of the service information, a receiving device may determine the expected DRX cycle length based on the period of the service information. As shown in FIG. 9, an offset value of the original DRX cycle (the DRX cycle indicated by the first signaling) is greater than active period duration, and corresponding service information waits, in a buffer of the terminal device, for being transmitted in a next DRX cycle. This causes a long communication delay. The expected DRX cycle length is determined, and the length of the DRX cycle is changed, so that the offset value is less than the active period duration, and a moment at which the service information is transmitted to the terminal device falls within the active period. This eliminates a delay of waiting of the service information in the buffer of the terminal device.

This update manner can effectively resolve a problem that the length of the DRX cycle does not match the period T of the service information.

Update Manner 3: The Activation Onduration Duration Expected by the Terminal Device The activation onduration duration expected by the terminal device is used to determine activation duration of the updated DRX cycle.

Figure 10:
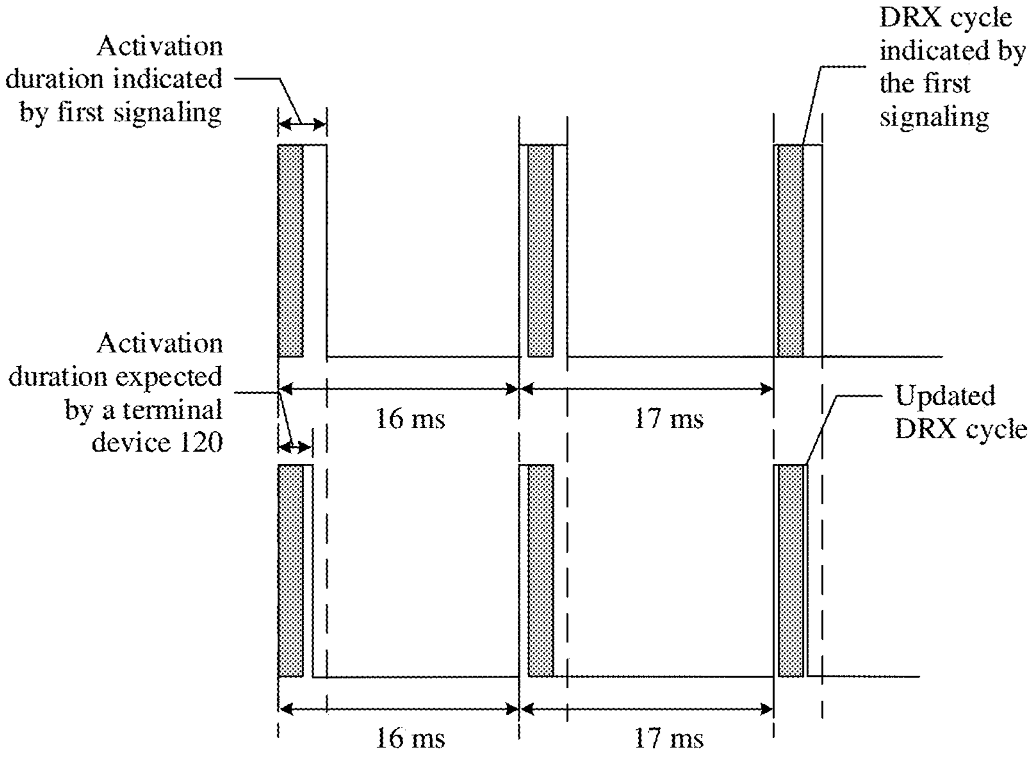
FIG. 10 is another schematic diagram of a communication method according to an embodiment of this application.

For example, as shown in FIG. 10, the terminal device may learn of duration for transmitting the service information to the terminal device. If activation duration of the original DRX cycle (the DRX cycle indicated by the first signaling) is excessively long, after transmission of the service information is completed, a transceiver is still in an enabled state for a long period of time, resulting in invalid activation of the transceiver and high power consumption of the terminal device.

Therefore, activation duration close to transmission duration of the service information may be determined, so that the expected activation duration is less than the activation duration of the original DRX cycle, thereby reducing invalid activation duration and reducing energy waste of the terminal device.

Optionally, the terminal device may feed back, to the network, duration for transmitting the service information to the terminal device, as a reference for configuring the DRX cycle by the network device.

In addition to being reduced, the active period duration may alternatively be increased in this embodiment of this application. If the active period duration of the original DRX cycle (the DRX cycle indicated by the first signaling) is excessively short, a receiver or a transmitter may be disabled before service information is transmitted completely. As a result, service information that is not transmitted completely needs to be transmitted in a next active period, a delay is long, and a packet loss rate is high.

Therefore, the activation duration greater than the transmission duration of the service information may be determined, so that updated activation duration is greater than the activation duration of the original DRX cycle, and the activation duration matches the transmission duration of the service information. It is ensured that the service information is completely transmitted in a current active period. In this way, the delay and the packet loss rate are reduced.

On a premise that normal transmission of the service information is ensured, this update manner can reduce duration in which the terminal device enables the receiver or the transmitter, and can reduce power consumption of the terminal device. Alternatively, the communication delay and the packet loss rate may be reduced on a premise that normal transmission of service information is ensured.

Update Manner 4: The Inactive Inactivity Duration Expected by the Terminal Device The information indicates inactive duration of the updated DRX cycle that is expected by the terminal device.

Figure 11A:
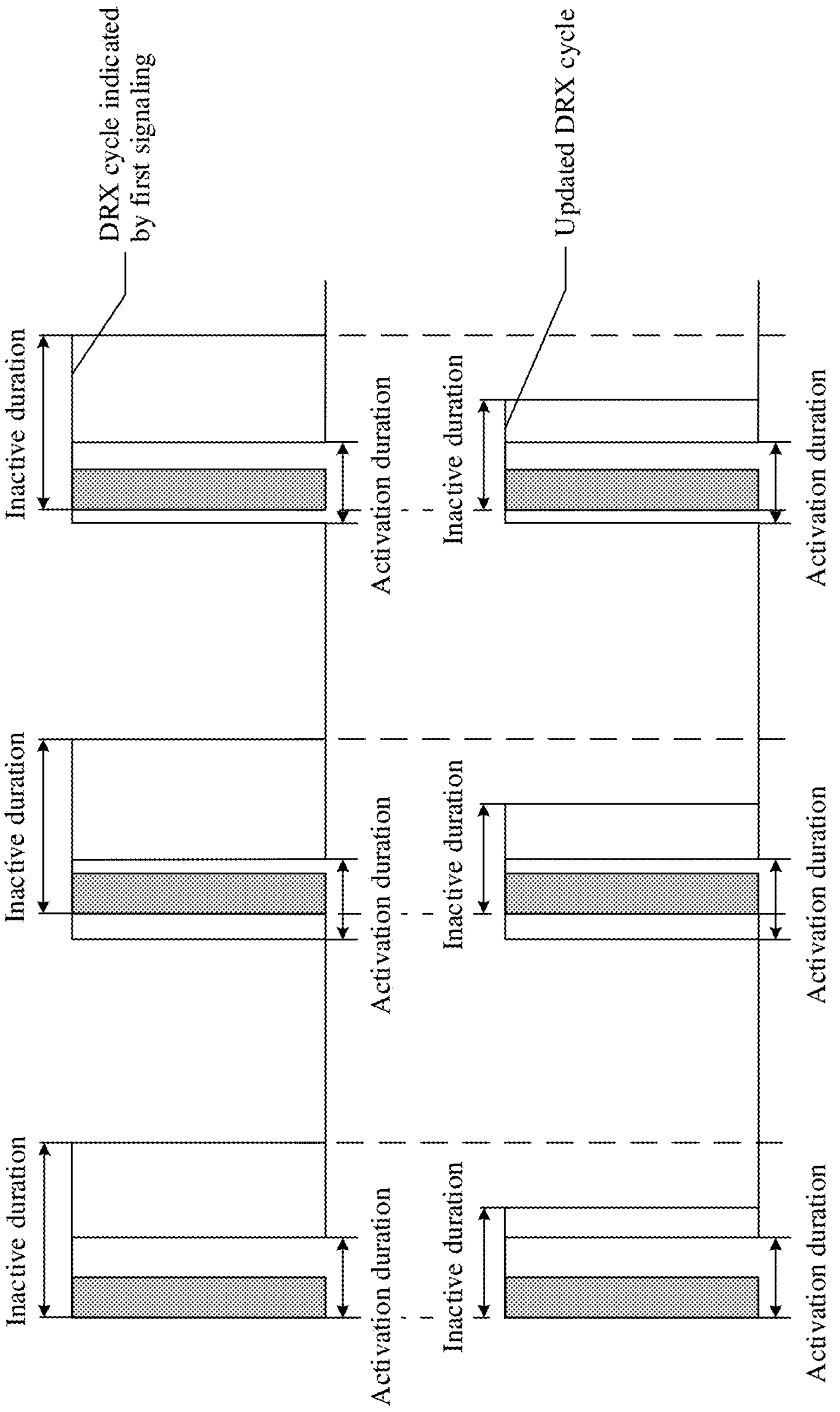
FIG. 11*a* is another schematic diagram of a communication method according to an embodiment of this application.

The inactive duration is used to prolong an enabling time of the transceiver based on a transmission status of the service information. As shown in FIG. 11*a*, a time at which the service information is transferred to the terminal device is a start point of the inactive period, and within the inactive duration, the receiver or the transmitter is in an enabled state, so as to transmit the service information. Optionally, within the inactive duration, the terminal device may alternatively send and receive information other than the service information, for example, information about another service, test information, or control information. This is not limited herein.

If the inactive duration is excessively long, in a time period from completion of service information transmission to an end of the inactive period, the transceiver is in an enabled state but does not transmit the service information, resulting in invalid activation of the transceiver and high power consumption of the terminal device.

Optionally, the terminal may feed back, to a network, duration for transmitting the service information to the terminal device, as a reference for configuring the DRX cycle by the network device.

For example, as shown in FIG. 11*a*, the inactive duration may be appropriately reduced based on content such as transmission duration of the service information, so that new inactive duration is less than inactive duration of the original DRX cycle, and invalid active duration is reduced, thereby reducing power consumption of the terminal device.

In addition to being reduced, the inactivity duration may alternatively be increased in this embodiment of this application. If the inactive duration of the original DRX cycle (the DRX cycle indicated by the first signaling) is excessively short, the transceiver may be disabled when the service information is not completely transmitted. As a result, the service information that is not completely transmitted needs to be transmitted in a next active period, the delay is long, and the packet loss rate is high.

Figure 11B:
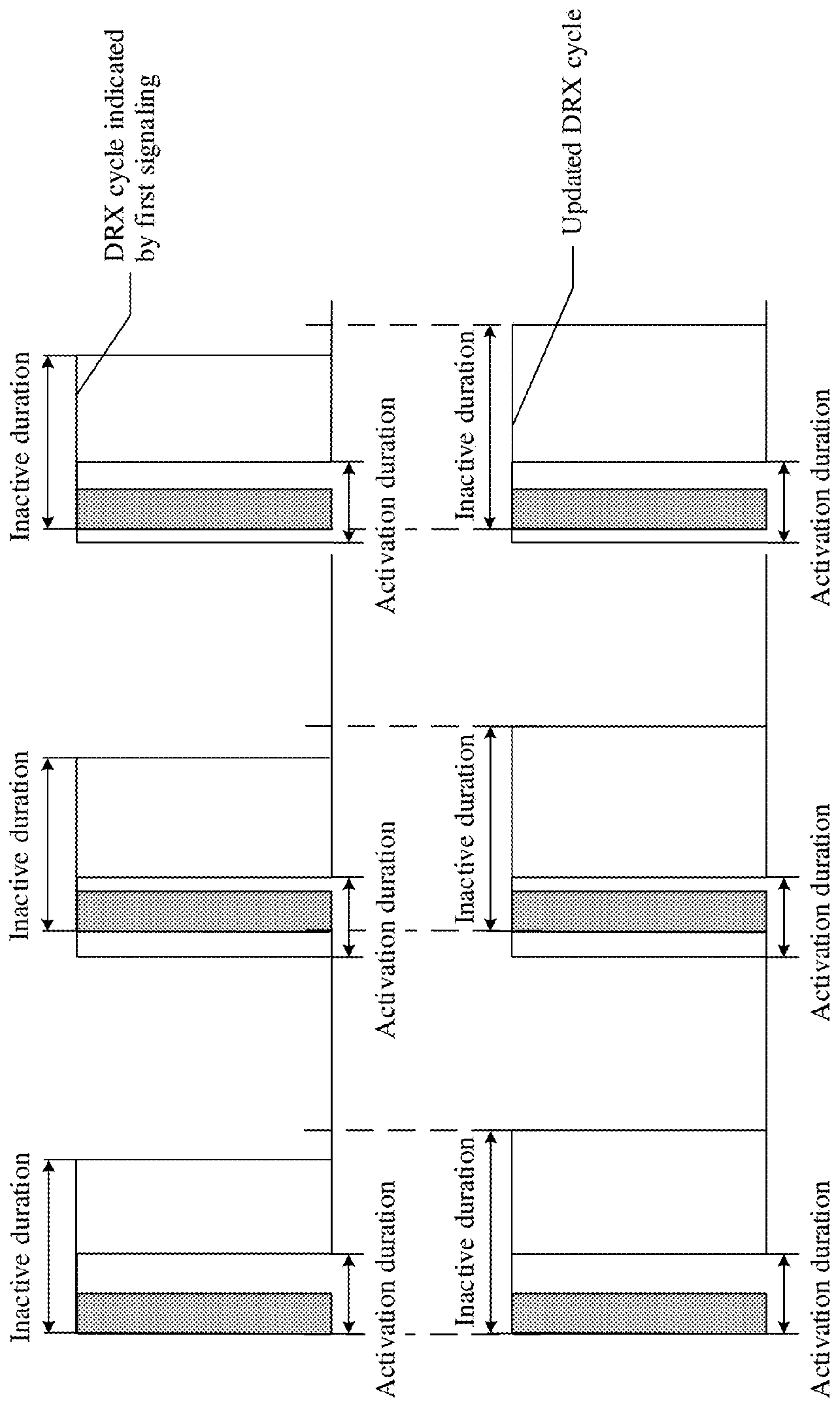
FIG. 11*b* is another schematic diagram of a communication method according to an embodiment of this application.

Therefore, as shown in FIG. 11*b*, inactive duration greater than the transmission duration of the service information may be determined, so that updated inactive duration is greater than the inactive duration of the original DRX cycle. This ensures that the service information is completely transmitted in a current active period, thereby reducing a delay and a packet loss rate.

The DRX cycle offset expected by the terminal device, the DRX cycle length expected by the terminal device, the activation onduration duration expected by the terminal device, the inactive inactivity duration expected by the terminal device, or other information expected by the terminal device in the foregoing four update manners can be collectively referred to as expected adjustment content.

Because the terminal device can accurately learn of information such as arrival time and duration of the service information, the expected adjustment content determined by the terminal device can better match the service information, and the updated DRX cycle determined based on the expected adjustment content can better match the service information.

It should be noted that updating for the DRX cycle shown in FIG. 8 to FIG. 10 are examples of the DRX cycle update manner, but is not an exhaustive list of the update manners. All methods that update the DRX cycle may fall within the scope of embodiments of this application.

The updated DRX cycle determined by the network device based on another method may still be shown in FIG. 8 to FIG. 10. This is not limited herein.

Optionally, the DRX cycle may be updated in a single dimension. For example, only the start time unit of the DRX cycle is updated. Alternatively, the DRX cycle may be updated in plurality of dimensions, for example, the start time unit and the length of the DRX cycle are updated at the same time. This is not limited herein.

The second signaling and the first signaling may be signaling of a same type or different types. For example, both the second signaling and the first signaling may be DCI information, or both may be RRC information. Alternatively, one of the first signaling and the second signaling is RRC information, and the other is DCI information. This is not limited herein.

In the foregoing embodiments provided in this application, the methods provided in embodiments of this application are separately described from the perspective of a network device, a terminal device, and interaction between the network device and the terminal device. To implement functions in the methods provided in the foregoing embodiments of this application, the network device and the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 12:
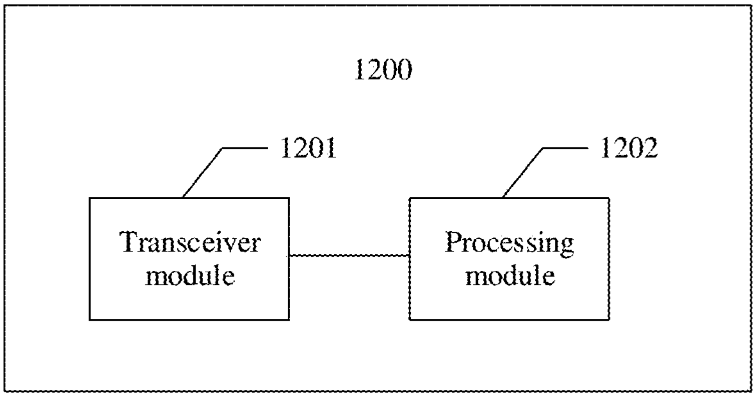
FIG. 12 is a schematic diagram of a structure of a communication apparatus according to an embodiment of this application.
Figure 13:
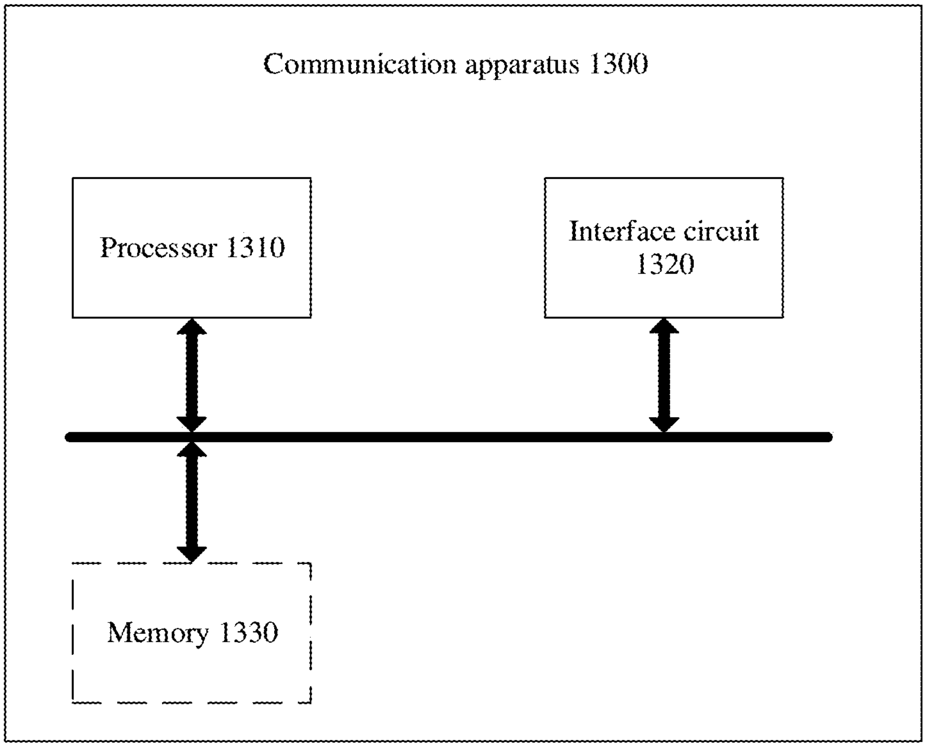
FIG. 13 is a schematic diagram of another structure of a communication apparatus according to an embodiment of this application.

FIG. 12 and FIG. 13 are schematic diagrams of structures of possible communication apparatuses according to embodiments of this application. The communication apparatuses may implement the functions of the terminal device or the network device in the foregoing method embodiments. Therefore, beneficial effect of the foregoing method embodiments can also be implemented. In embodiments of this application, the communication apparatus may be the terminal device 110 shown in FIG. 1, may be the access network device 120 shown in FIG. 1, or may be a module (for example, a chip) used in the terminal device or the access network device.

As shown in FIG. 12, a communication apparatus 1200 includes a transceiver module 1201 and a processing module 1202. The communication apparatus 1200 may be configured to implement functions of the terminal device or the network device in the method embodiments shown in FIG. 4, FIG. 5*d*, or FIG. 7.

When the communication apparatus 1200 is configured to implement functions of the terminal device in the method embodiment in FIG. 4, the transceiver module 1201 is configured to receive first signaling, where the first signaling indicates a length and/or a start time unit of each DRX cycle in a plurality of DRX cycles, and at least two DRX cycles in the plurality of DRX cycles have different lengths; and the processing module 1202 is configured to perform information transmission based on the plurality of DRX cycles.

When the communication apparatus 1200 is configured to implement functions of the network device in the method embodiment in FIG. 4, the transceiver module 1201 is configured to send first signaling, where the first signaling indicates a length and/or a start time unit of each DRX cycle in a plurality of DRX cycles, at least two DRX cycles in the plurality of DRX cycles have different lengths; and the processing module 1202 is configured to perform information transmission based on the plurality of DRX cycles.

When the communication apparatus 1200 is configured to implement functions of the terminal device in the method embodiment in FIG. 5*d*, the transceiver module 1201 is configured to receive first signaling and send fourth signaling, where the fourth signaling indicates a start time unit and/or length of each determined DRX cycle; and the processing module 1202 is configured to perform information transmission based on the plurality of DRX cycles.

When the communication apparatus 1200 is configured to implement functions of the network device in the method embodiment in FIG. 5*d*, the transceiver module 1201 is configured to send first signaling and receive fourth signaling, where the fourth signaling indicates a start time unit and/or a length of each DRX cycle; and the processing module 1202 is configured to perform information transmission based on the plurality of DRX cycles.

When the communication apparatus 1200 is configured to implement functions of the terminal device in the method embodiment in FIG. 7, the transceiver module 1201 is configured to receive first signaling and second signaling, where the second signaling indicates to update a start time unit and/or a length of each DRX cycle in a plurality of DRX cycles; and the processing module 1202 is configured to perform information transmission based on the updated DRX cycles indicated by the second signaling.

When the communication apparatus 1200 is configured to implement functions of the network device in the method embodiment in FIG. 7, the transceiver module 1201 is configured to send first signaling and second signaling, where the second signaling indicates to update a start time unit and/or a length of each DRX cycle in a plurality of DRX cycles; and the processing module 1202 is configured to perform information transmission based on the updated DRX cycles indicated by the second signaling.

For more detailed descriptions of the transceiver module 1201 and the processing module 1202, refer to the related descriptions in the foregoing method embodiments. Details are not described herein again.

As shown in FIG. 13, a communication apparatus 1300 includes a processor 1310 and an interface circuit 1320. The processor 1310 and the interface circuit 1320 are coupled to each other. It may be understood that the interface circuit 1320 may be a transceiver or an input/output interface. Optionally, the communication apparatus 1300 may further include a memory 1330, configured to store instructions executed by the processor 1310, input data required for running instructions by the processor 1310, or data generated after the processor 1310 runs instructions.

When the communication apparatus 1300 is configured to implement the method in the foregoing method embodiments, the processor 1310 is configured to perform the functions of the processing module 1202, and the interface circuit 1320 is configured to perform the functions of the transceiver module 1201.

When the communication apparatus is a chip used in a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any regular processor or the like.

The method steps in embodiments of this application may be implemented in a hardware manner, or may be implemented in a manner of executing software instructions by a processor. The software instructions may include a corresponding software module. The software module may be stored in a random access memory (RAM), a flash memory, a read-only memory (ROM), a programmable read-only memory (PROM), an erasable programmable read-only memory (eEPROM), an electrically erasable programmable read-only memory (EEPROM), a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in an access network device or a terminal device. Certainly, the processor and the storage medium may exist in the access network device or the terminal device as discrete components.

All or some of the foregoing embodiments may be implemented by using software, hardware, firmware, or any combination thereof. When software is used to implement embodiments, all or some of the embodiments may be implemented in a form of a computer program product. The computer program product includes one or more computer programs and instructions. When the computer programs or instructions are loaded and executed on a computer, all or some of the processes or functions in embodiments of this application are executed. The computer may be a general-purpose computer, a dedicated computer, a computer network, or other programmable apparatuses. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; may be an optical medium, for example, a DVD; or may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application, "at least one" means one or more, and "a plurality of" means two or more. "And/or" describes an association relationship between associated objects and indicates that three relationships may exist. For example, A and/or B may indicate the following three cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A communication method, comprising:

sending first signaling, wherein the first signaling indicates at least one of a length or a start time unit of each discontinuous reception (DRX) cycle in a plurality of DRX cycles, and wherein at least two DRX cycles of the plurality of DRX cycles have different lengths; and performing information transmission based on the plurality of DRX cycles, wherein the start time unit of each DRX cycle of the plurality of DRX cycles is determined based on a period, wherein the period is an arrival period of a packet.

2. The method according to claim 1, wherein the start time unit of each DRX cycle of the plurality of DRX cycles is further determined based on a start offset.

3. The method according to claim 2, wherein a start time unit of an nth DRX cycle of the plurality of DRX cycles satisfies the following formula:

$$\text{the start time unit of the } nth \text{ DRX cycle}=\text{fun}(T\times(n-1))+\text{startoffset, wherein}$$

fun is a rounding function, n is a positive integer, startoffset is the start offset, and Tis the period.

4. The method according to claim 1, wherein a length of an nth DRX cycle of the plurality of DRX cycles satisfies the following formula:

$$\text{length of the } nth \text{ DRX cycle}=\text{fun}(T\times n)-\text{fun}(T\times(n-1)),\text{ wherein}$$

fun is a rounding function, n is a positive integer, and T is the period.

5. A communication method, comprising:

receiving first signaling, wherein the first signaling indicates at least one of a length or a start time unit of each discontinuous reception (DRX) cycle of a plurality of discontinuous reception DRX cycles, and at least two DRX cycles of the plurality of DRX cycles have different lengths; and performing information transmission based on the plurality of DRX cycles, wherein the start time unit of each DRX cycle of the plurality of DRX cycles is determined based on a period, wherein the period is an arrival period of a packet.

6. The method according to claim 5, wherein the start time unit of each DRX cycle of the plurality of DRX cycles is further determined based on a start offset.

7. The method according to claim 6, wherein a start time unit of an nth DRX cycle of the plurality of DRX cycles satisfies the following formula:

$$\text{the start time unit of the } nth \text{ DRX cycle}=\text{fun}(T\times(n-1))+\text{startoffset, wherein}$$

fun is a rounding function, n is a positive integer, startoffset is the start offset, and Tis the period.

8. The method according to claim 5, wherein a length of an nth DRX cycle in the plurality of DRX cycles satisfies the following formula:

length of the *nth* DRX cycle=fun($T \times n$)−fun($T \times (n-1)$), wherein fun is a rounding function, n is a positive integer, and T is the period.

9. A communication apparatus, comprising:

one or more processors; and at least one memory, wherein the at least one memory stores instructions, and when executing the instructions stored in the memory, the one or more processors executes operations comprising:

sending first signaling, wherein the first signaling indicates at least one of a length or a start time unit of each discontinuous reception (DRX) cycle of a plurality of DRX cycles, and at least two DRX cycles of the plurality of DRX cycles have different lengths; and performing information transmission based on the plurality of DRX cycles, wherein the start time unit of each DRX cycle of the plurality of DRX cycles is determined based on a period, wherein the period is an arrival period of a packet.

10. The communication apparatus according to claim 9, wherein the start time unit of each DRX cycle of the plurality of DRX cycles is further determined based on a start offset.

11. The communication apparatus according to claim 10, wherein a start time unit of an nth DRX cycle of the plurality of DRX cycles satisfies the following formula:

the start time unit of the *nth* DRX cycle=fun($T \times (n-1)$)+startoffset, wherein fun is a rounding function, n is a positive integer, startoffset is the start offset, and Tis the period.

12. The communication apparatus according to claim 9, wherein a length of an nth DRX cycle of the plurality of DRX cycles satisfies the following formula:

length of the *nth* DRX cycle=fun($T \times n$)−fun($T \times (n-1)$), wherein fun is a rounding function, n is a positive integer, and T is the period.

13. A communication apparatus, comprising:

one or more processors; and at least one memory, wherein the at least one memory stores instructions, and when executing the instructions stored in the memory, the one or more processors executes operations comprising:

receiving first signaling, wherein the first signaling indicates at least one of a length or a start time unit of each discontinuous reception (DRX) cycle of a plurality of DRX cycles, and at least two DRX cycles in the plurality of DRX cycles have different lengths; and performing information transmission based on the plurality of DRX cycles, wherein the start time unit of each DRX cycle of the plurality of DRX cycles is determined based on a period, wherein the period is an arrival period of a packet.

14. The communication apparatus according to claim 13, wherein the start time unit of each DRX cycle of the plurality of DRX cycles is further determined based on a start offset.

15. The communication apparatus according to claim 14, wherein a start time unit of an nth DRX cycle of the plurality of DRX cycles satisfies the following formula:

the start time unit of the *nth* DRX cycle=fun($T \times (n-1)$)+startoffset, wherein fun is a rounding function, n is a positive integer, startoffset is the start offset, and Tis the period.

16. The communication apparatus according to claim 13, wherein a length of an nth DRX cycle of the plurality of DRX cycles satisfies the following formula:

length of the *nth* DRX cycle=fun($T \times n$)−fun($T \times (n-1)$), wherein fun is a rounding function, n is a positive integer, and T is the period.

17. The method according to claim 1, wherein the packet includes service information.

18. The method according to claim 17, wherein there is a correspondence between a frame rate of the service information and the period.

* * * * *